US006993572B2

(12) United States Patent
Ross, Jr. et al.

(10) Patent No.: US 6,993,572 B2
(45) Date of Patent: *Jan. 31, 2006

(54) SYSTEM AND METHOD FOR FACILITATING INTERNET COMMERCE WITH OUTSOURCED WEBSITES

(75) Inventors: D. Delano Ross, Jr., Alpharetta, GA (US); Daniel D. Ross, Dunwoody, GA (US); Joseph R. Michaels, Marietta, GA (US); William R. May, Atlanta, GA (US); Richard A. Anderson, Powder Springs, GA (US)

(73) Assignee: DDR Holdings, LLC, Dunwoody, GA (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/461,997

(22) Filed: Jun. 11, 2003

(65) Prior Publication Data

US 2004/0148366 A1 Jul. 29, 2004

Related U.S. Application Data

(63) Continuation of application No. 09/398,268, filed on Sep. 17, 1999, now Pat. No. 6,629,135.

(60) Provisional application No. 60/100,697, filed on Sep. 17, 1998.

(51) Int. Cl.
G06F 15/16 (2006.01)
G06F 17/21 (2006.01)
(52) U.S. Cl. .................................. 709/218; 715/501.1
(58) Field of Classification Search ................ 709/218, 709/219, 228; 715/501.1, 744, 746, 738, 715/760, 804; 705/26
See application file for complete search history.

(56) References Cited

U.S. PATENT DOCUMENTS

| | | |
|---|---|---|
| 5,319,542 A | 6/1994 | King, Jr. et al. |
| 5,515,270 A | 5/1996 | Weinblatt |
| 5,537,314 A | 7/1996 | Kanter |
| 5,590,197 A | 12/1996 | Chen et al. |
| 5,596,702 A | 1/1997 | Stucka et al. |
| 5,630,125 A | 5/1997 | Zellweger |
| 5,699,528 A | 12/1997 | Hogan |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |

(Continued)

OTHER PUBLICATIONS

Yergeau, F. et al.,"Internationalization of the Hypertext Markp Language", RFC 2070, p. 1-43, Jan. 1997.*

(Continued)

Primary Examiner—Jason D Cardone
(74) Attorney, Agent, or Firm—Louis J. Hoffman

(57) ABSTRACT

An e-commerce outsourcing system and method provides hosts with transparent, context-sensitive e-commerce supported pages. The look and feel of a target host is captured for future use. The host is provided with one or more links for inclusion within a page on the host website that correlates with a selected commerce object, which may be contextually related to material in the page. The commerce object can be a product, a product category, or a dynamic selection indicator. Upon activation of the provided link, a visitor computer is served with a page with the look and feel of the host website and with content based upon the associated commerce object. Where the commerce object is a dynamic selection indicator, the content is selected at the time of activation based upon an analysis of the page containing the activated link.

27 Claims, 24 Drawing Sheets

U.S. PATENT DOCUMENTS

| | | | |
|---|---|---|---|
| 5,721,827 A | 2/1998 | Logan et al. | |
| 5,724,424 A | 3/1998 | Gifford | |
| 5,724,521 A | 3/1998 | Dedrick | |
| 5,727,159 A | 3/1998 | Kikinis | |
| 5,745,681 A | 4/1998 | Levine et al. | |
| 5,796,952 A | 8/1998 | Davis et al. | |
| 5,802,299 A | 9/1998 | Logan et al. | |
| 5,809,481 A | 9/1998 | Baron et al. | |
| 5,812,769 A | 9/1998 | Graber et al. | |
| 5,819,285 A | 10/1998 | Damico et al. | |
| 5,825,884 A | 10/1998 | Zdepski et al. | |
| 5,848,396 A | 12/1998 | Gerace | |
| 5,860,068 A | 1/1999 | Cook | |
| 5,862,325 A | 1/1999 | Reed et al. | |
| 5,878,219 A | 3/1999 | Vance, Jr. et al. | |
| 5,884,033 A | 3/1999 | Duvall et al. | |
| 5,884,045 A | 3/1999 | Kurihara | |
| 5,890,175 A | 3/1999 | Wong et al. | |
| 5,893,091 A | 4/1999 | Hunt et al. | |
| 5,894,554 A | 4/1999 | Lowery et al. | |
| 5,895,468 A | 4/1999 | Whitmyer, Jr. | |
| 5,897,622 A | 4/1999 | Blinn et al. | |
| 5,898,836 A | 4/1999 | Freivald et al. | |
| 5,907,830 A | 5/1999 | Engel et al. | |
| 5,913,040 A | 6/1999 | Rakavy et al. | |
| 5,913,202 A | 6/1999 | Motoyama | |
| 5,915,243 A | 6/1999 | Smolen | |
| 5,918,239 A | 6/1999 | Allen et al. | |
| 5,926,798 A | 7/1999 | Carter | |
| 5,930,765 A | 7/1999 | Martin | |
| 5,933,811 A | 8/1999 | Angles et al. | |
| 5,937,392 A | 8/1999 | Alberts | |
| 5,940,834 A | 8/1999 | Pinard et al. | |
| 5,940,843 A | 8/1999 | Zucknovich et al. | |
| 5,948,061 A | 9/1999 | Merriman et al. | |
| 5,956,709 A | 9/1999 | Xue | |
| 5,963,915 A | 10/1999 | Kirsch | |
| 5,978,766 A | 11/1999 | Luciw | |
| 5,983,227 A | 11/1999 | Nazem et al. | |
| 5,983,270 A | 11/1999 | Abraham et al. | |
| 5,987,498 A | 11/1999 | Athing et al. | |
| 5,991,735 A | 11/1999 | Gerace | |
| 5,991,740 A | 11/1999 | Messer | |
| 6,012,098 A * | 1/2000 | Bayeh et al. | 709/246 |
| 6,023,714 A * | 2/2000 | Hill et al. | 715/513 |
| 6,029,141 A | 2/2000 | Bezos et al. | |
| 6,128,655 A * | 10/2000 | Fields et al. | 709/219 |
| 6,141,666 A | 10/2000 | Tobin | |
| 6,230,173 B1 * | 5/2001 | Ferrel et al. | 715/513 |
| 6,253,188 B1 | 6/2001 | Witek et al. | |
| 6,629,135 B1 * | 9/2003 | Ross et al. | 709/218 |
| 6,763,343 B1 * | 7/2004 | Brooke et al. | 707/1 |

OTHER PUBLICATIONS

Hudson, S. et al.,"Supporting dynamic downloadable appearances in an extensible user interface toolkit", ACM Symposium on User Interface Software and Technology, p 159-168, Oct. 1997.*

"Agent-Mediated Electronic Commerce: Issues, Challenges and Some Viewpoints", Hyacinth S. Nwana, Jeff Rosenschein, Tuomas Sandholm, Carles Sierra, Pattie Maes, and Rob Guttmann, Proceedings of the 2nd International Conference on Autonomous Agents, pp. 189-196, May (1998).

"An Adaptive Algotithm for Learning Changes in User Interests", Dwi H. Widyantoro, Thomas R. Ioerger and John Yen, Proceedings of Conference on Knowledge and Information Management, pp. 405-412, Nov. (1999).

"A Multilevel Approach to Intelligent Information Filtering: Model, System, and Evaluation", ACM Transactions on Information Systems, vol. 15, Issue 4 (1997), pp. 368-399.

Web Pages, http://www.broadvision.com (1996).

PCT International Search Report PCT/US99/21656 dated Jan. 25, 2000.

Dialog file 16 (database PROMT (R)), No. 6016914, BookSite launches version 3.0 of the popular electronic commerce web site. "Business Wife," 2 pp, Feb. 23, 1996.

Dialog file 16 (database PROMT (R)), No. 6296727, "Amazon.com introduces "Amazon.com Associates"—a new model for internet-based commerce." Business Wife, 3 pp, Jul. 18, 1996.

Can Mixing 'Cookies' with Online Marketing be a Recipe for Heartburn? (Infoworld, vol. 18, No. 30), Jul. 22, 1996.

RealTime Travel Info Available Online (Dailog database file 9, document 01107096), Jan. 17, 1995.

Online Growth Virtually Untapped; PC Vendors Taking More Advantage of Booming Sales (Computer Retail Week vol. 4, No. 64, p. 160), Jun. 6, 1994.

Selected documents from Incognito Café Web site describing Book Stacks Unlimited links partner program.

Resnick P., Iacovou, N., Suchak, M., Bergstrom P., and Riedl, J., GroupLens: An Open Architecture for Collaborative Filtering of Netnews. *Proceedings of ACM 1994 Conference on Computer Supported Cooperative Work*, Chapel Hill, NC, pp 175-186.

Balabanovic, M., and Shopham, Y., Fab: Content-Based Collaborative Recommendation. *Communications of the ACM*, vol. 40, No. 3, (Mar. 1997) pp 66-73.

"Places to Stay, Now WorldRes, Completes $4 Million 1st-Round Venture"; news release fro http://www.wiredhotelier.com; Mar. 4, 1997.

"Wordless Provides CVBs Free Internet Technology for Web/Voice Hotel Bookings"; news release from http://www.wiredhotelier.com; Jul. 22, 1997.

"San Diego's CVB Is First To Implement internet Reservations Through Worldres"; news release from http://www.wiredhotelier.com; Sep. 20, 1997.

"About WorldRes"; web page printout; URL: http//web.archive.org/web/19970702032337/www.worldres.com; 1997.

Christensen, Eric; "Mapping a More Complete Internet Strategy"; web page printout, URL: http://web.archive.org/web/19970702032753/www.worldres.com; 1997.

Dukay, Kristin. "Unifying a large corporate Web site: A case study of www.microsoft.com." Proc. IEEE Int'l Professional Communication Conference 1997, pp. 321-327.

"Marketing Software on the Internet: A White Paper"; Digital River, Inc.; 1998.

"Technology Solutions to Electronic Transactions: A White Paper"; Digital River, Inc.; 1998.

Form S-1, Amendment No. 4; filed with Securities and Exchange Commission, by Digital River, Inc.; Aug. 11, 1998.

"Worldres Teams Up With Yahoo!"; news release from http://www.wiredhotelier.com; Sep. 16, 1998.

Cimino JJ, et al. "Architecture for a Web-Based Clinical Information System that Keeps the Design Open and the Access Closed." Proc. AMIA Symp. 1998, pp. 121-125; Nov., 1998.

* cited by examiner

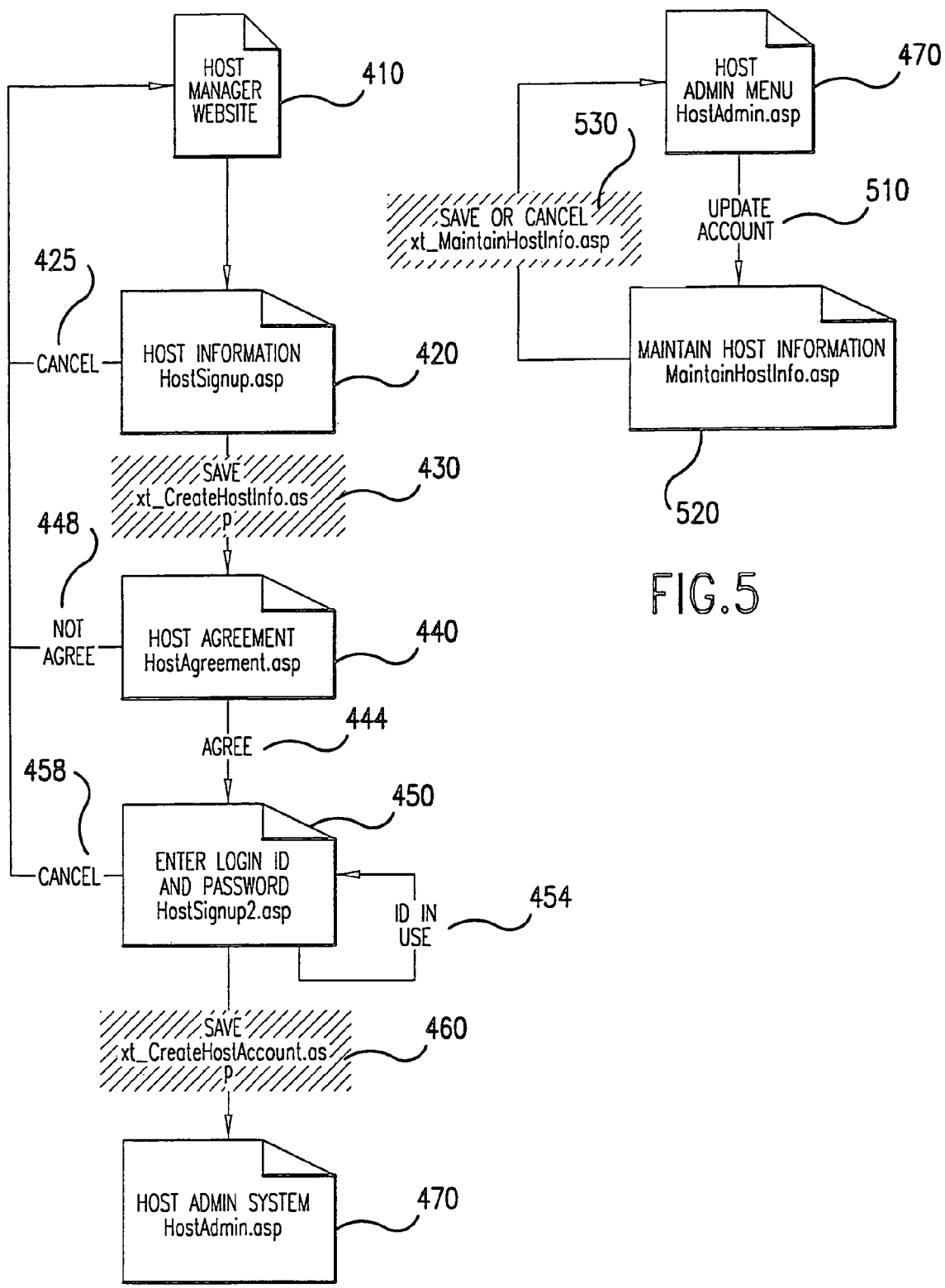
FIG.4 / FIG.5

SYSTEM AND METHOD FOR FACILITATING INTERNET COMMERCE WITH OUTSOURCED WEBSITES

CROSS-REFERENCE TO RELATED APPLICATIONS

This is a continuation of application Ser. No. 09/398,268, filed Sep. 17, 1999, now U.S. Pat. No. 6,629,135, which claims the benefit of application Ser. No. 60/100,697, filed Sep. 17, 1998, which applications are hereby incorporated by reference.

BACKGROUND OF INVENTION

1. Field of Invention

The invention relates to a system and method supporting commerce syndication. More specifically, the invention relates to a system and method for computer based information providers to receive outsourced electronic commerce facilities in a context sensitive, transparent manner.

2. Description of Prior Art

The World Wide Web began as a simple interface to the Internet using HTML (hypertext markup language) as a means of linking documents together. This allowed a researcher, for example, to embed "active" references in his or her documents that, if selected, would enable the reader to review the source of the reference first-hand. Programmers quickly capitalized on this technology, creating "web sites" which reflected less staid purposes, laying the groundwork for the literal "web" of content and interactive applications that exists today. In the early stages, website programmers increased visitor traffic by placing "links" within their websites to other websites, usually related in content or function, in exchange for a reciprocal link. Additionally, directories of websites, such as Yahoo, and search engines, such as WebCrawler, began to appear in an attempt to organize the content of the Internet so that its users could create "custom links pages" related to specific topics.

In these early days, the Web was mostly trafficked by programmers and "techies," and a commune-type "share and share alike" mindset prevailed. As a result, people were happy to litter their sites with links, knowing that, odds were, others would do the same for them and the traffic gain/loss would probably balance out. So, despite the fact that by including and promoting a "links" page, website operators were effectively encouraging people to leave their website, link sharing developed into a standard practice.

Then, entrepreneurs and other business-oriented individuals came along and introduced capitalism to the Internet. Profit-oriented website operators began to seek visitors wherever they could find them, and opportunistic owners of popular sites began to realize that they had an increasingly scarce resource—visitors. Such website owners began to sell the links they had previously offered for free in the form of paid advertisements. Search engines and directories became increasingly popular for two main reasons. First, the number of websites was growing astronomically, so it was becoming harder for users to find what they wanted. Second, since reciprocal links were either going away or were being replaced by links exclusively to non-competing websites, search engines and directories were the only way to find multiple resources for a single topic.

Amid frantic efforts on the part of corporate websites to get noticed, the sale of banner ads blossomed into a large industry called Internet advertising. Thousands of websites created space for banner ads and called the space "inventory." At first, they priced ads as a print ad might be priced: by CPM, or cost per thousand "impressions" each ad made on website visitors. Over time this pricing model gave way to arrangements more favorable to advertisers such as Cost Per Click-through and Cost Per Inquiry (meaning the advertiser only needs to pay when a visitor sees a banner ad and clicks on it and completes an information request form on the advertiser's site).

Some of the most successful Internet commerce websites, led by online bookseller Amazon.com, have begun to take an even more results-driven approach to the purchase of banner ads. They have offered to pay only for ads that, when clicked, result in a product sale. To provide a stronger incentive than a simple banner ad, these companies let third-party website owners list a subset of their goods (e.g., 10 of Amazon.com's millions of books, selected by the website owner) and promote them as they choose within their websites. Initiatives such as these have come to be described as "affiliate programs", "associate programs" or "commission based advertising programs".

The benefits of affiliate programs are significant. To the website owner, they constitute revenue-generating web content without requiring an investment in product inventory or additional infrastructure. They also create new revenues without necessarily reducing the website's available ad inventory. However, the greater benefit almost always accrues not to the affiliate, but to Amazon.com and other online stores. Not only do these sites benefit from the marketing resources of the affiliate operators, they are also able to lure the visitor traffic away from the affiliate. Once a visitor clicks on an affiliate ad and enters an online store, that visitor has left the affiliate's site and is gone. At best, affiliates are able to use "frames" to keep a shell of their own website around the vendor's site, but this is only a marginally effective solution. No alternatives have been able to address a fundamental drawback of the affiliate programs —the loss of the visitor to the vendor. At best, some Internet affiliate sales vendors have begun placing "return to referring website" links on their order confirmation screens, an approach that is largely ineffective. This limitation of an affiliate program restricts participation to less trafficked websites that are unconcerned about losing visitors. Meanwhile, search engines and directories continue to increase in their usefulness and popularity, while banner ads and old-style links continue their rapid loss of effectiveness and popular usage.

The present invention overcomes these limitation of present affiliate commerce systems and provides other benefits as will become clearer to those skilled in the art from the foregoing description.

SUMMARY OF THE INVENTION

The affiliate commerce system and method of the present invention represents a new paradigm of co-marketing on the Internet. Not only does the present invention provide its Hosts with the added value and incremental revenues of traditional affiliate programs, but the company also enables Hosts to control the customer experience before, during, and after the purchase transaction. At the same time, Merchants receive the same benefits as with older affiliate programs, i.e., increased marketing potential, incremental sales, and new customer relationships, but without the restrictive limitations of affiliate programs—the loss of hard-won visitor traffic.

Additionally, the present invention can actually obviate the need for some merchants to invest in their own unique Internet presence. By using the present invention as their primary online sales channel, these Merchants can focus on product development, production, and order fulfillment and leave the exploration of the Internet to experts. The resulting ongoing cost savings and operational efficiencies magnify the potential benefits of the Internet while reducing the initial costs.

According to the present invention the look and feel of each participating Host is captured and stored. Hosts may include links to selected products or product categories within pages residing on the Hosts' website. Upon actuation of such a link by a visitor of the Host website, a page is presented to the visitor incorporating a replica of the Host's look and feel directed to the sale of the selected products or product categories.

The look and feel of a host is captured and stored by receiving an identification of an example page of a target host. The identified page is retrieved. The look and feel elements of the page are identified, and these elements are stored for future use in generating outsourced transparent pages, pages served by a server other than the host but with the host's look and feel. Such pages give the viewer of the page the impression that she is viewing pages served by the host.

The links included by the host directed to the outsource provider need not be statically linked to a particular product or product category. Such links may direct the outsource provider to dynamically select content to serve within the host's look and feel. This content may be selected based upon a contextual analysis of the page which includes the link. Further, the dynamic content need not be limited to products or product categories but may include any content within the system's data store that is amenable to contextual correlation with content in the page containing the link.

A cost effective, scalable architecture may be used to serve dynamically constructed pages such as those served by the e-commerce outsource provider. This architecture includes three levels: a Web server layer, an application server layer and a database server layer.

The Web server layer provides a front end presentation layer for interacting with end users. This layer may consist of one or more interchangeable low cost server systems. Any request from an end user may be fielded by any system within the layer. The selected system can contact any application server within the application layer to provide processed data for use in responding to the end user request.

The application layer supports interacting with the database server level to acquire needed data and processing it prior to presentation by the Web server layer. As with the Web server layer, this layer may consist of one or more interchangeable low cost server systems. Any Web server system may submit a request to any application server. The application server includes processing functionality suitable for the types of pages to be dynamically constructed.

The database server layer supports low level management of data used in dynamic page construction. The data store across the one or more low cost server systems is seamlessly viewed as an integrated whole. As a consequence, any database server within the layer can field any request for data submitted by an application server.

BRIEF DESCRIPTION OF THE DRAWINGS

FIG. 4 is a flow chart of the pages and procedures in the host signup process.

FIG. 5 is a flow chart of the pages and procedures in the host account information maintenance process.

Figure 15:
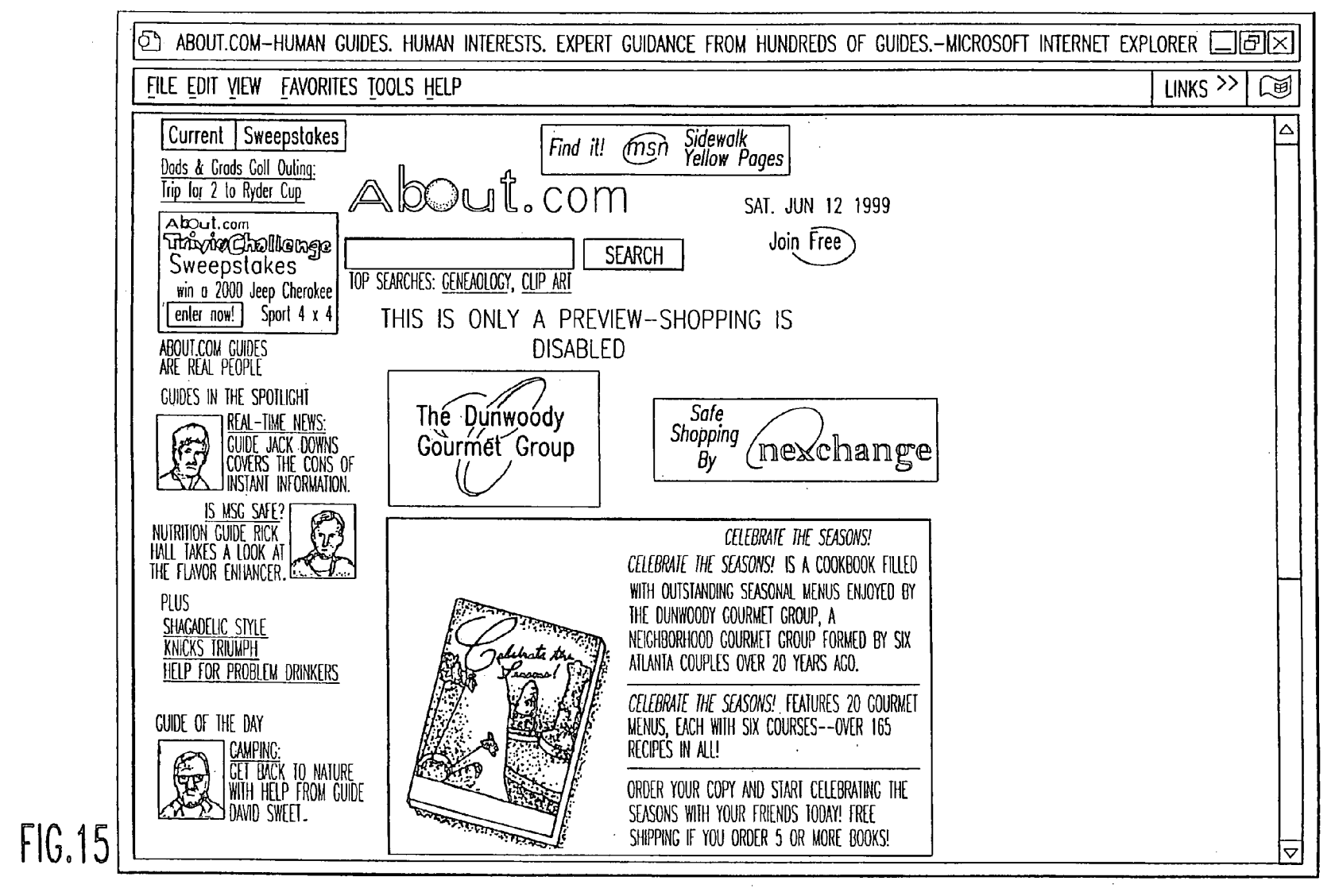

FIGS. 11–18 are screen captures of the page in a preferred embodiment of a look and feel capture process.

FIG. 19 is a screen capture of a typical e-commerce supported page served in a preferred embodiment.

DETAILED DESCRIPTION OF THE INVENTION

Figure 1:
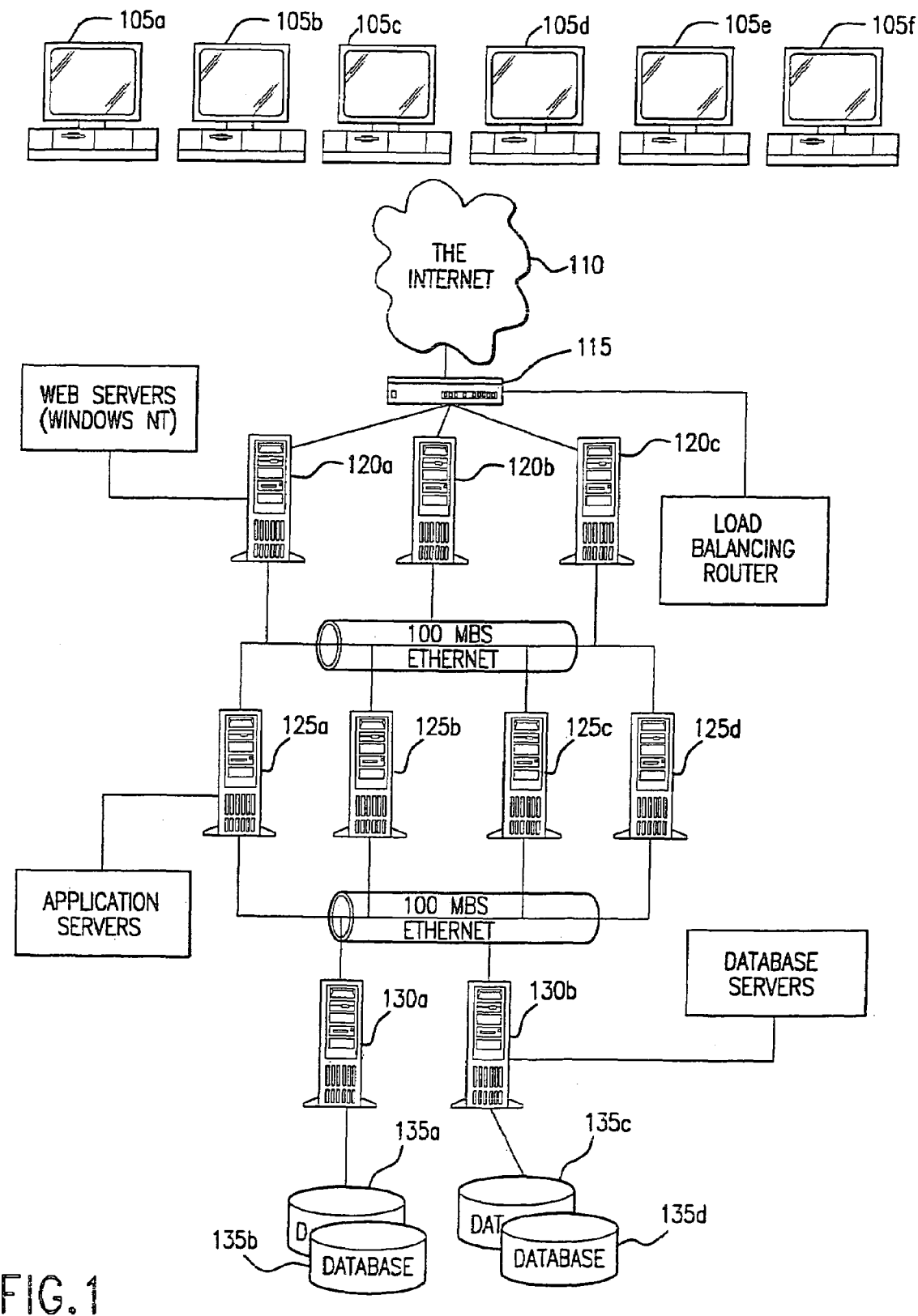
FIG. 1 depicts a typical hardware architecture implementing the present invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

A typical embodiment of the present invention will include a data store including a look and feel description associated with a host website, a communications link to a visitor computer, and a processor. The processor performs the tasks of capturing a look and feel description associated with a host website, storing the captured look and feel description in the data store, providing the host website with a link that link correlates the host website with a commerce object for inclusion within a page on the host website and which, when activated, causes the processor to serve an e-commerce supported page via the communication link with a look and feel corresponding to the captured look and feel description of the host website associated with the provided link and with content based on the commerce object associated with the provided link. The Internet serves as the communication link to visitor computers.

In a preferred embodiment as exhibited by FIG. 1, the duties of the processor are split among several computer systems 120*a*–120*c*, 125*a*–125*d*, 130*a*–130*b*. The data store may be implemented through a database system 130*a*–130*b*, 135a–135d. The Internet 110 serves as the communication link to visitor computers 105a–105f. In this preferred embodiment, the system utilizes multiple inexpensive computer systems at every level of the architecture. Routing between levels will automatically distribute the load amongst the functioning computers. Increasing throughput becomes a matter of adding more computers, not scaling up the existing ones. This arrangement also provides fault tolerance since the failure of one server will not incapacitate the system as long as another server providing the same service is alive. This approach also permits the distribution of servers geographically. A router 115 may also provide further load balancing.

The tasks performed by the processor may utilize a variety of underlying software technology. In a preferred embodiment, the software architecture can be divided into 3 tiers: web server, application-server and database-server. Each tier is comprised of a number of software layers.

Web Server Tier

Figure 2:
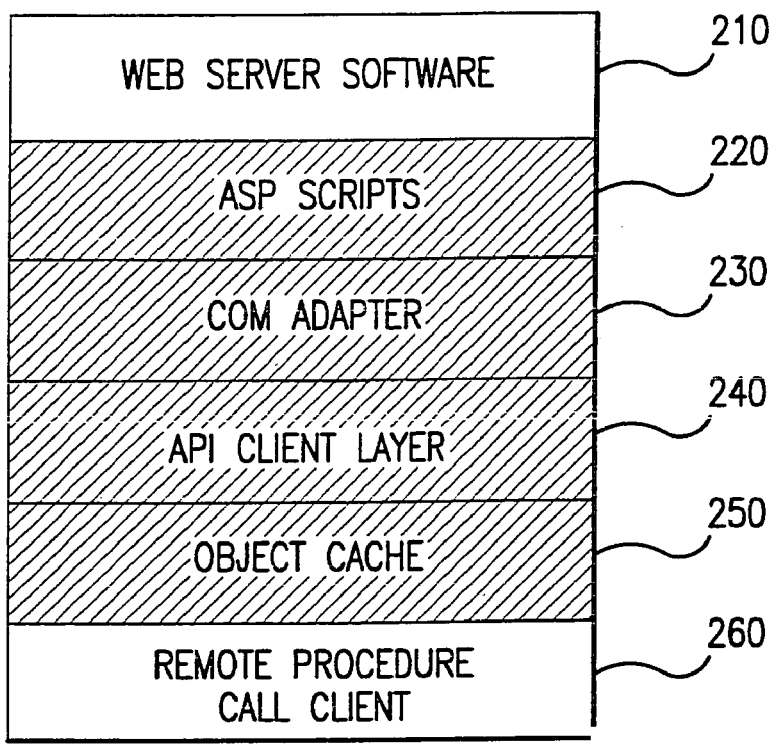
FIG. 2 illustrates the software architecture of the Web server layer.

The Web Server tier accesses application functionality by calling a single "Request" Application Programming Interface (API). The API will take a Document Object Model (DOM) (as specified by W3C in http://www.w3.org/TR/REC-DOM-Level-1, which is expressly incorporated herein by reference in its entirety) object as a parameter and return a DOM object as the response. The request will be relayed to the application server tier where a dispatching method will unpack the request object, inspect it, invoke the desired method, and send back the response object. This approach means that new functionality becomes available as soon as the application server is upgraded. It is not necessary to develop a set of "stubs" that mirror the new API call. This is a major advantage because new functionality in the application tier can be exploited immediately simply by modifying the Active Server Page (ASP) scripts. No web server resident Dynamic Link Libraries (DLLs) need to be upgraded so the server does not need to be shut down. The web server tier will typically run on server computers 120a–120c having a multitasking operating system such as Windows NT from Microsoft or other suitable operating system software. The Web Server tier contains the following layers as illustrated in FIG. 2:

Web Server Software 210. In a preferred embodiment, IIS by Microsoft is the server software. It supports serving side scripting using the VBScript scripting language.

ASP Scripts 220. All HTML content is rendered by ASP server scripts. The ASP scripting environment can interact with software modules written to Microsoft's COM specification.

COM Adapters 230. A set of COM wrappers provides the bridge between the ASP scripts and other elements of the system. The wrappers provide the necessary data conversions but do not contain any substantial functionality. The wrappers are not application specific.

API Client Layer 240. The API Client Layer consists of the very thin "request" API described above. This layer cooperates with the Object Cache layer. For example, before retrieving a catalog from the application layer, this layer may check to see if the requested catalog is already in the object cache.

Object Cache 250. The object cache contains the responses to previously submitted requests. All items in the cache are marked with an expiration time that is set at the time they are originally retrieved. The purpose of this layer is to reduce the load on the application tier.

Remote Procedure Call Client 260. The Remote Procedure Call Client provides connectivity to the application tier. It also provides request routing. In the event of application server failure, this client will automatically reconnect to a working server. This piece of software is not application dependent. In a preferred embodiment, the DBMS Component Server Client is the Objectstore Component Server Client (OCSC).

In a preferred embodiment, the Web server layer supports the following four Web interface modules. In a preferred embodiment, these modules are encoded with ASP to generate appropriate HTML and Javascript. The four modules are as follows:

1. Merchant Manager

The Merchant Manager is the "Control Center" for Merchants. This module allows the merchant to maintain their products, catalogs, contact information, track orders, process returns, run reports, etc.

A merchant representative must login before performing any system activities. Any valid merchant user will be able to perform all possible actions on the merchant to which it is related. Only registered merchants will have a valid account. An account for a merchant is established when the merchant registers with the system. A merchant representative may initiate registration via a web interface. The signup process must collect basic merchant information, including the information necessary to pay the merchant, and a password, which will be used to create a user account for the merchant. Once the merchant is approved (this may be automatic), the merchant will be sent an email containing a unique user id which can be used to login to the system.

Figure 9:
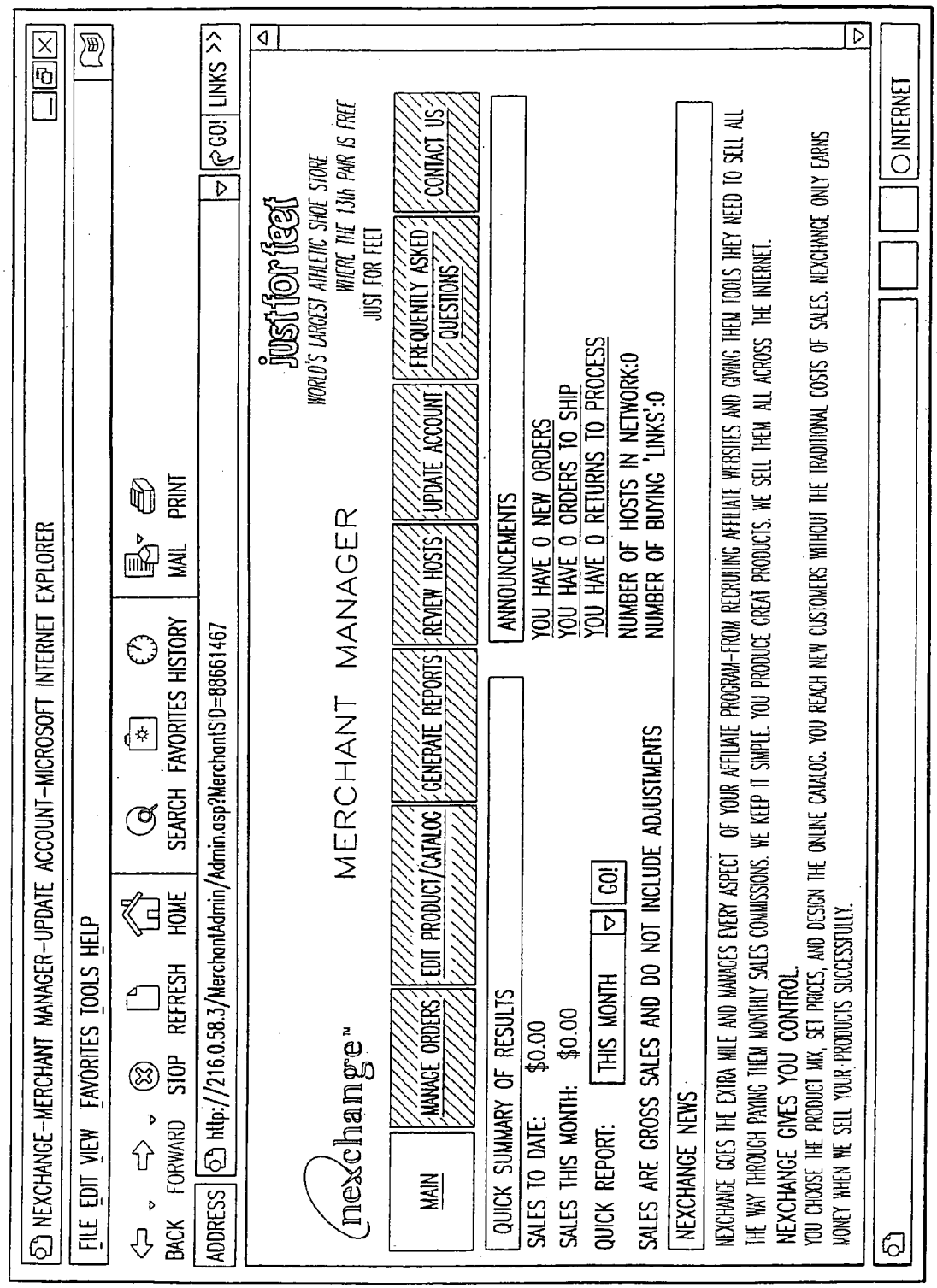
FIG. 9 is a screen capture of a Merchant Manager page in a preferred embodiment.

When a representative logs in, she is taken directly to the Merchant Manager as seen in FIG. 9 and assigned a Merchant Session ID (Merchant SID). All pages within the merchant system must retrieve the MerchantSID from the HTTP request and validate it. If the session does not validate, the representative is taken back to the Login screen.

This module contains the following submodules:

Account Information

Figure 23:
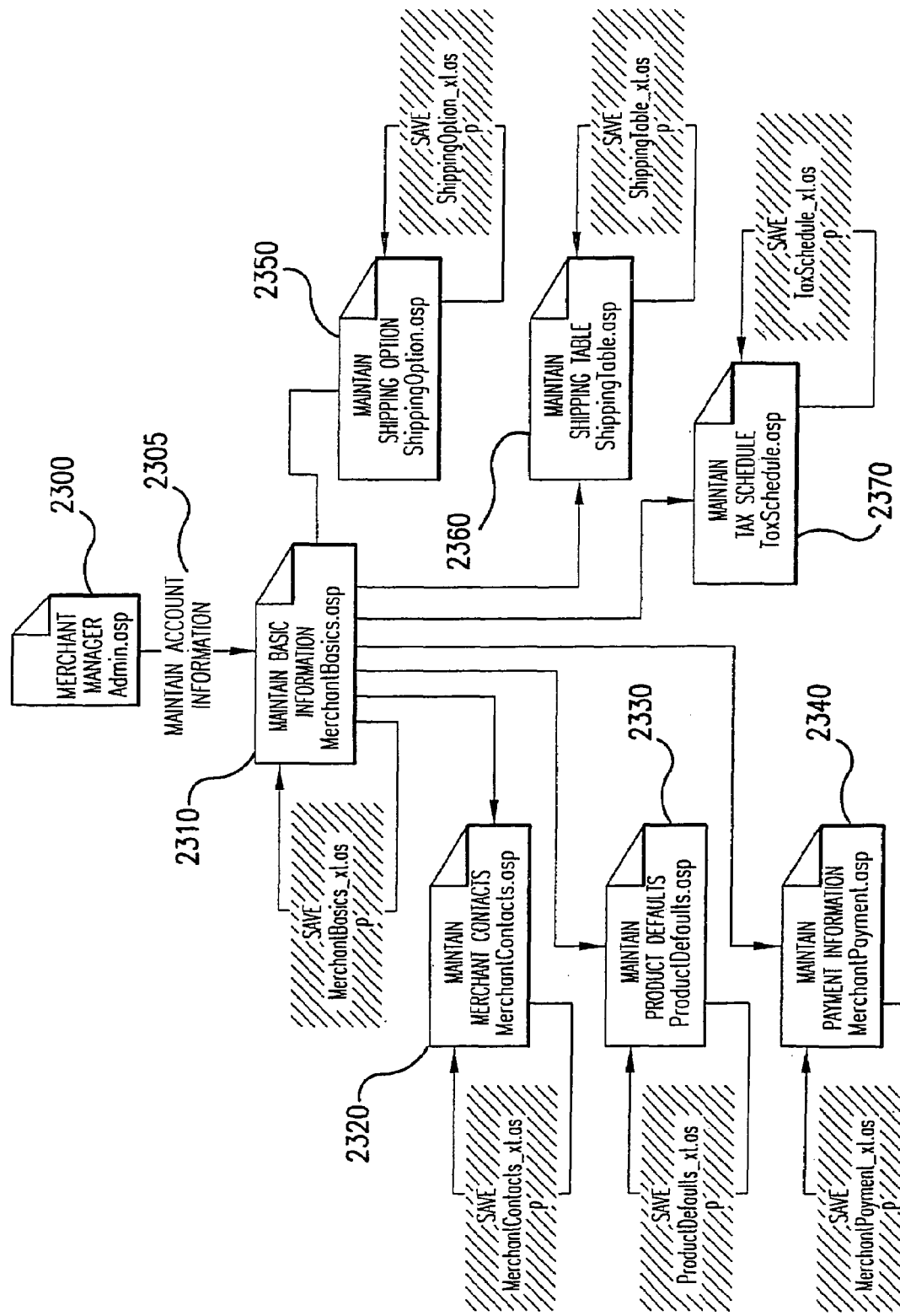
FIG. 23 is a flow chart of the pages and procedures in the merchant account maintenance process.

A merchant representative will be able to maintain the basic merchant profile, which includes the information needed to pay the merchant, the merchant's password, and the merchant's shipping policy information. FIG. 23 depicts the pages and procedures in a typical merchant account maintenance process. The representative selects to maintain account information 2305 from the Merchant Manager page 2300 leading to the display of the a basic information modification page 2310. Each modifiable information type could be altered through a designated page available through the basic information page 2310. Each such page could provide functionality to save any changes made to the particular page.

This sub-module allows a merchant to maintain the following types of information:

Basic information 2310—name, description, address, logo

Contacts 2320—for admin, finance, returns, support, order notification

Product Defaults 2330—price labels, unit of weight, display options

Payment Info 2340—check or ACH, payee info, bank info

Shipping Option 2350—by price, items, weight, other or NA

Shipping Table 2360—maintain shipping methods and prices

Tax Schedule 2370—set tax rate for states in which taxes are collected. This may be automated in the future.

Products and Catalogs

Here the merchant can both maintain products and arrange them into catalogs. Example product attributes include:

name description attributes—such as size, color, etc.

price(s)—normal, sale, competitor's and the price can be set or changed by an attribute small image—used in most places large image—used for zoom-in in shopping The merchant can also maintain their catalogs and categories. A catalog is the top level category. A merchant can have one or more catalogs. Each catalog will be presented to Hosts as a separate entity. However, it is still tied back to the merchant. The merchant logo can be assigned to the catalog or a different image selected.

A catalog is considered a commerce object. Further, a catalog is populated with product or product category commerce objects. An indicator for dynamic selection of a product or product category may also be considered a commerce objects; however, such objects would not appear in a catalog.

Categories are then placed in the catalog(s). Categories can also be placed into other categories. A catalog or category can contain an infinite number of categories but really should be kept to less than 10 at any given level for presentation purposes. The bottom level categories contain products. The product node is actually a pointer to the product in the inventory table. This allows for a product to be placed into multiple categories.

A catalog, category or a product can be set to be inactive. If it is set as inactive, it will not be available to the hosts to browse or sell. It will also not be available to customers in the shopping area. If a catalog or category is set as inactive, then every item beneath it (categories or products) is also inactive.

A product also has a flag to indicate it is out of stock. When a product is no longer going to be sold by the merchant, it should be set to inactive. If the product is simply out of stock, thus temporarily unavailable, the out of stock flag should be used.

If a host has an existing link that points to an inactive or out of stock product or an inactive catalog or category, the customer will be taken to the first level above that is active. For example, if a customer clicks on a Link that points to coffee pot A, and coffee pot A has been set to inactive, the shopping page will display the entire coffee pot category (all the active coffee pots). If the coffee pot category was set to inactive, then the shopping page would go to the next level up (such as Kitchen Appliances). In this case the shopper will be given a message indicating the selected product or category is not available. If a host has a link associated with a dynamic selection indicator commerce object, the triggering of such a link will cause the dynamic selection of a product or product category.

Figure 24:
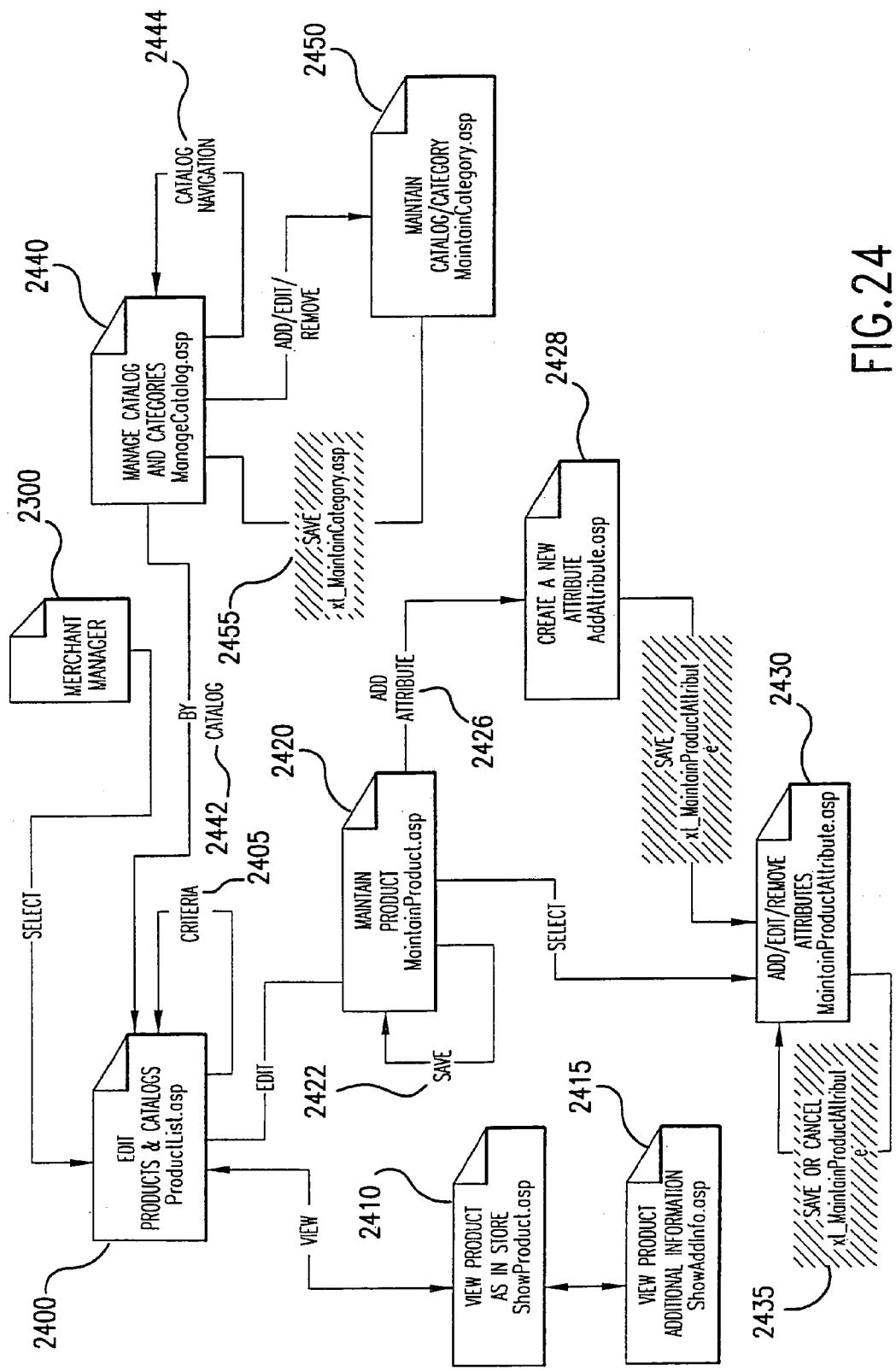
FIG. 24 is a flow chart of the pages and procedures in the merchant catalog maintenance process.

FIG. 24 depicts pages and procedures used in a merchant catalog and product maintenance process. When a merchant representative logs into the system, she is presented with the merchant manager page 2300. From this page, she may choose to proceed to the edit products and catalogs page 2400. On this page, she may elect to search for a product through entering criteria 2405. She may elect to preview a particular product 2410 and, from the preview, view additional information associated with the particular product 2415.

From the edit products and catalogs page 2400, she may also choose to edit a particular product 2420 or edit by catalog or category 2442. In editing a particular product 2420, she may elect to save the information associated with the product 2422, select a current attribute to edit 2424 leading to the attribute edit page 2430 or create a new attribute associated with the product 2426. An attribute includes a collection of options such as sizes or colors. If she selects to add a new attribute 2426, a new attribute creation page is presented 2428. Upon creation of the new attribute, the new attribute is saved, and the representative proceeds to the attribute edit page 2430. From this page, she may choose to save or cancel the current attribute edit 2435.

If the representative chooses to edit by catalog or category 2442, she is presented a page allowing selection of catalogs or categories 2440 through navigating the catalog/category hierarchies 2444. Once a particular catalog or category is identified, she may edit it via a catalog/category edit page 2450. After editing, the alterations are saved 2455 returning her to the catalog or category selection page 2440.

Reports

A merchant representative may request on-demand reports. Such reports include an account statement that details all payments to the merchant, and statistics about catalog visits and sales. Statistics can be correlated to hosts, links, products and time periods.

Figure 25:
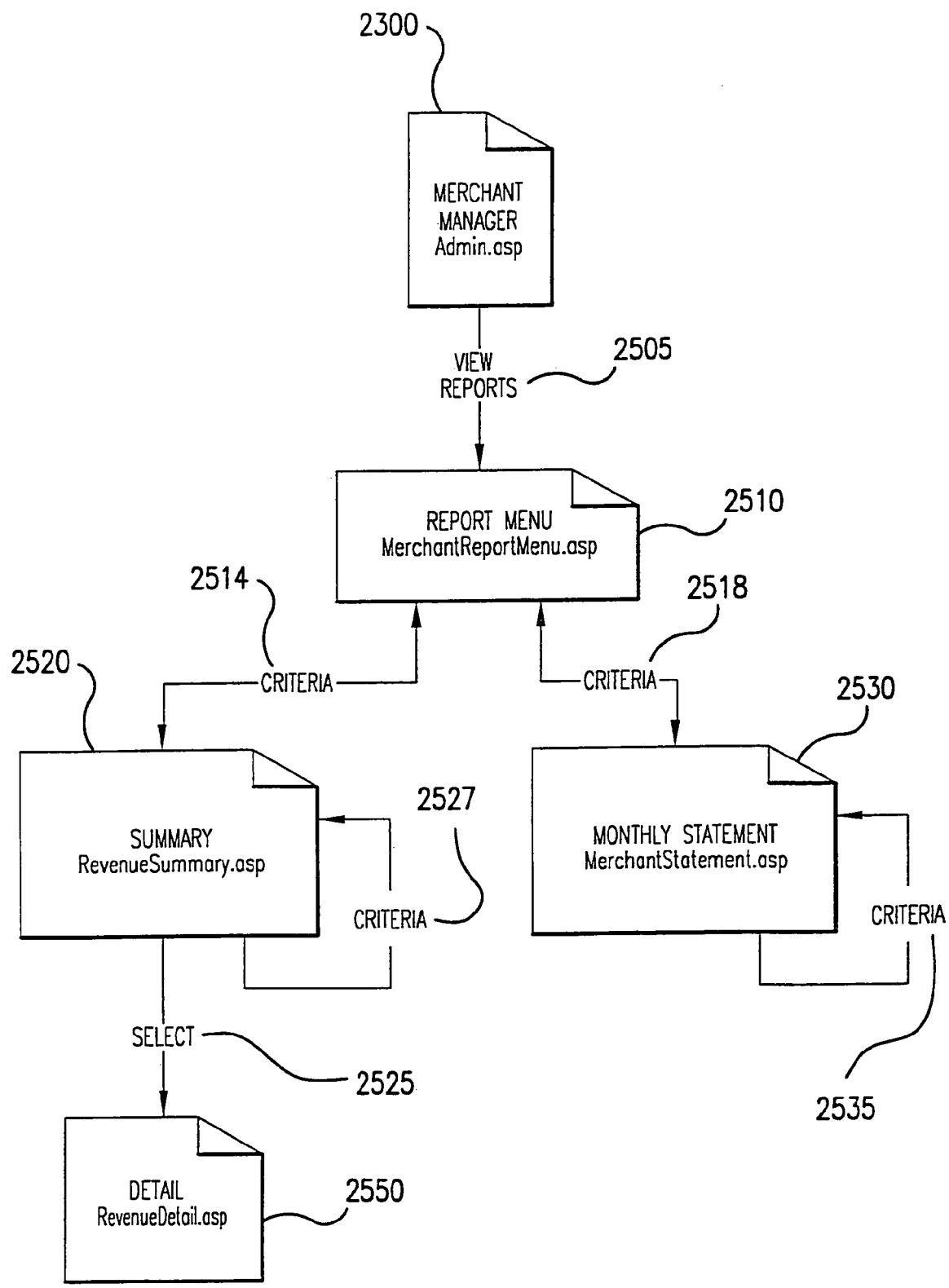
FIG. 25 is a flow chart of the pages and procedures in the merchant view reports process.

As illustrated in FIG. 25, a merchant representative begins at the Merchant Manager page 2300. She selects the view reports option 2505 to view the report menu page 2510. From the reports menu page 2510, she may enter criteria 2514, 2518 leading respectively to a revenue summary page 2520 or a monthly statement page 2530. From the monthly statement page 2530, she may change criteria 2535 to view a revised monthly statement 2530 or return to the report menu 2510. From the revenue summary page 2520, she may select a specific item 2525 for receiving a detailed revenue page 2550, alter the criteria 2527 to receive a revised revenue summary 2520, or return to the reports menu page 2510. From the detailed revenue page 2550, she may return to the revenue summary page 2520.

The following reports are available for the merchants to track their results:

Revenue Summary by Month

This report provides sales and traffic information summarized by month. Data includes number of sessions, number of orders, gross and net sales, etc. Summarizes at the month level and allows 'Drill Down' to daily information.

Revenue Summary by Host

This report provides sales and traffic information summarized by host. Data includes number of sessions, number of orders, gross and net sales, etc.

Revenue Summary by Product

This report provides sales and traffic information summarized by Product. Data includes number of sessions, quantity in shopping cart and gross order amount.

All reports can be run as quick reports (this month, last month, this year, last year, all sales) or by inputting a specific date range.

Order Tracking

A merchant representative can access a web interface that allows her to report the status of orders. This includes:

reporting when the order was shipped, along with tracking information, and the status of all returned items.

The order tracking sub-module allows the merchant to manage all areas of an order. An order can have the following status:
- new—the order has been received and credit card information validated
- pending—the merchant has acknowledged the order, it is waiting to be shipped
- shipped—the merchant has shipped the order An order can be shipped in multiple shipments. The merchant is credited for sales on shipped items.

The customer may also return part of an order or the entire order. The customer will obtain an RMA number (see the Shopping sub-module). All the merchant needs to do is acknowledge they have received the product back from the customer.

Review Hosts

The Merchant Manager also allows the merchant to review which hosts have built links to that merchant's products. The merchant can also view the host web page containing such links.

A merchant representative will be able to review the list of hosts with which the merchant has a relationship. The merchant will have access to some basic information about the host, including at least one of the host's links, so that the host's look and feel can be evaluated.

Figure 26:
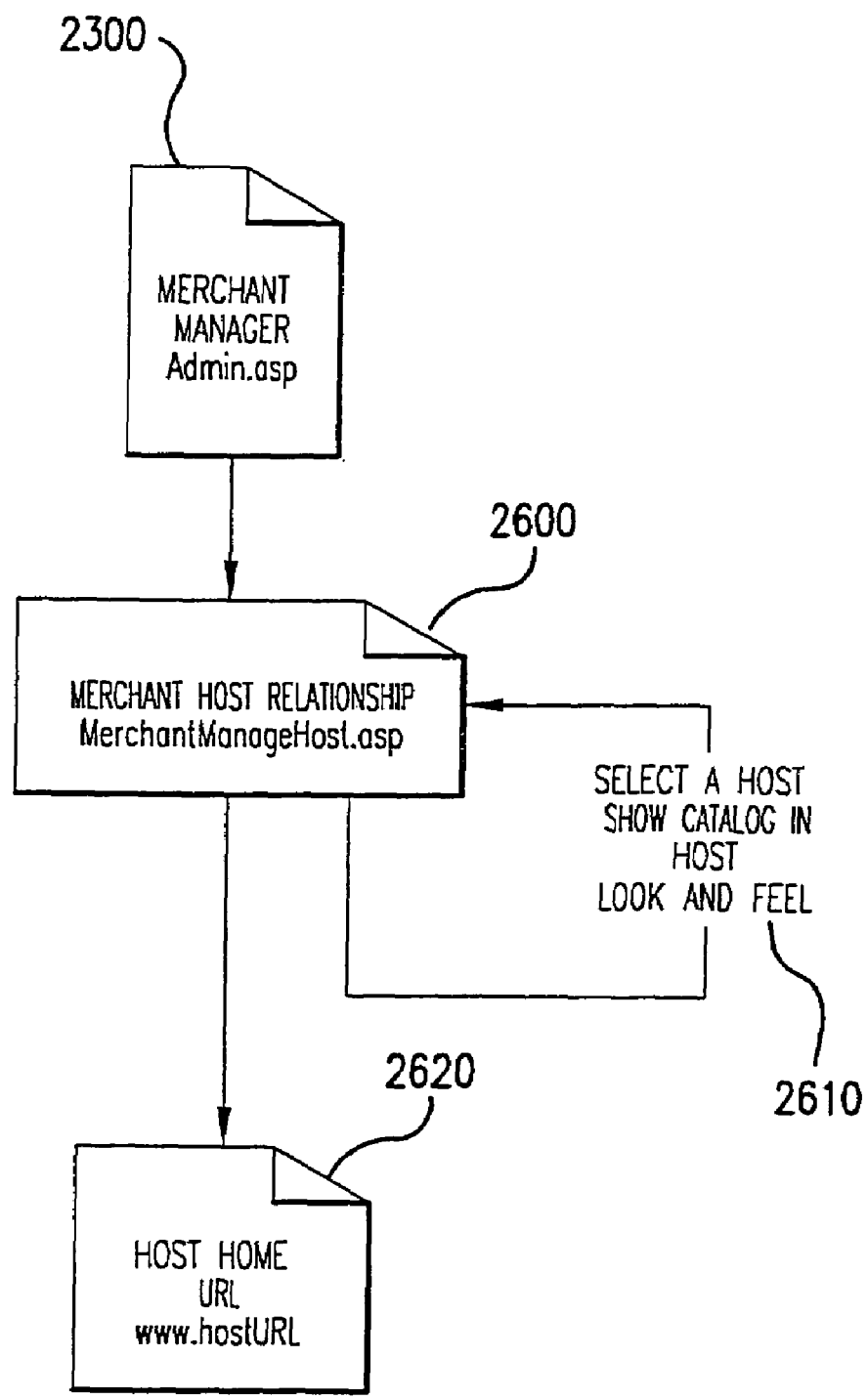
FIG. 26 is a flow chart of the pages and procedures in the merchant view hosts process.

In a preferred embodiment, a representative may review hosts through pages and procedures as depicted in FIG. 26. She begins at the Merchant Manager page 2300. She selects the review hosts option to view the merchant-host relationship page 2600. From this page, she may elect to view one of her products in the host's look and feel 2610 or view a list of links with the selected host that are directed to her commerce objects 2620.

Automated interfaces can be introduced for merchants wishing to integrate their business systems with the functionality supported by the present inventions. Merchants can update their online catalogs, retrieve information on orders placed, and send order status updates back via automated interfaces. This integration is accomplished through the establishment and use of a standardized communication protocol.

In a preferred embodiment, merchants integrate by exchanging specially formatted XML documents over secure HTTP connections (i.e. HTTP over SSL). If the request is a query, the HTTP response will contain an XML document with the query results. Likewise, if the request is a command, the response will be an XML document containing the success or failure of the command.

Automated requests and responses are XML documents as described by the W3C's XML 1.0 specification, which may be found at http://www.w3.org/TR/REC-xml and which is expressly incorporated herein by reference in its entirety. The XML specification only describes the syntax of an XML document, it does not place any restrictions on the content of the document. The content of requests and responses is described using a formal notation known as DCD (for Document Content Description). DCD's are described in a note that was submitted to the W3C by Microsoft and IBM. The DCD note can be viewed online at: http://www.w3.org/TR NOTE-dcd and which is expressly incorporated herein by reference in its entirety. A specific DCD describes the format of a request or response in the same way that the SMTP specification describes the format of an email. Typical DCDs for Automated Interfaces may be accessed at the following URLS: http://automation.nexchange.net/dcd/ManageInventory.01.02.dcd.xml and http://automation.nexchange.net/dcd/ManageCatalog.01.02.dcd.xml, both documents are expressly incorporated herein by reference in their entirety.

All interfaces have the same basic structure. The table below illustrates the basic structure of Automated Interface requests and responses.

|  |  |  |
|---|---|---|
| HEADER | Response | <ManageOrders specification='http://www.nexchange.net/automated/xml/ManageOrders.01.01.dcd'><br>  <RequestHeader><br>    <Authentication<br>      username='xxx'<br>      password='xxx'<br>      scope='xxx'<br>    /><br>    <Instructions OnFail='HALT'/><br>    <Receipt Processor='xxx' Date='xxx' Number='xxx'/><br>    <ResponseSummary Status='SUCCESS'><br>      Error Message Here<br>    </ResponseSummary><br>  </RequestHeader> |
| BODY | Query | <RequestBody><br>  <Command status='SUCCESS'><br>    <QueryNewOrders /> |
|  | query |     <QueryNewOrdersResponse><br>      Query Results Here<br>    </QueryNewOrdersResponse><br>  </Command> |
|  | Operation |   <Command status='SUCCESS'><br>    <AcknowledgeOrder order_id='xxx' item_price_total='xxx'/><br>  </Command><br></RequestBody><br></ManageOrders> |

All responses contain the original request with status information and query results appended. The table above shows a response to a Manage Orders request. The response is divided into a header and a body section ("RequestHeader" & "RequestBody" respectively).

The RequestHeader element contains authentication information and global instructions. When the request is returned, the request header will also contain a receipt and a response summary. The authentication element carries the information needed to identify and authenticate the requesting party. The global instruction element contains instruction on how the request is to processed if an error is received. The remainder of the commands in the request can be processed or the request can be discontinued. In a response, the receipt element is added to the request header. Information in the receipt can be used to recover the response. The response summary element contains a status code, which will be set to "SUCCESS" if all commands were completed successfully.

The RequestBody element contains one or more command elements. The exact content of a command element depends on the interface being used. When a command is submitted, its status attribute will always be "REQUESTED". When the command has been processed, the response will echo back the command with the status changed to "SUCCESS", "FAILURE" or "SKIP". In the case of a query command, the response will contain a query response in addition to the status.

If the request conforms to the DCD, the response will contain the original request with the status and query results embedded. The command status codes must be inspected to determine what has been done.

If the request did not conform to the specification, two possible error types can occur:

XML Parsing Error
DCD Validating Error

Errors are returned as NexError node. If a NexError is returned, the XML document has not been processed. The returned XML should always be examined for a NexError.

If the request document is not valid XML, an XML Parsing Error will be returned. A NexError node will be added around the entire document. It will look similar to the following:

```
<NexError Msg=" XML Parsing Error" ... >
    <XMLParseError errorcode=" " reason=" " line=" " linepos=" ">
        offending section of document
    </XMLParseError>
</NexError>
```

The errorcode, reason, line and linepos will contain information explaining what the error is and the location in the file.

If the request document is valid XML but does not match the published Interface DCD, a DCD Validating Error will be returned. A NexError node will be added around the entire document. A DCDError node will be embedded in the document at the location of the error. It will look similar to the following:

```
<NexError Msg=" XML Validating Error" ... >
    <XMLValidateError msg="Find the DCDError Node in the document for detailed error information."/>
    ... Valid Portion of document ...
    <DCDError message=" ">
```

-continued

```
        offending section of document
    </DCDError>
    ... Valid Portion of document ...
    </ XMLValidateError >
</NexError>
```

The following is an example request attempt to add one new product and to update the price of an existing product.

```
<ManageInventory
specification='http://automation.nexchange.net/dcd/Manage
Inventory.01.02.dcd.xml'>
    <RequestHeader>
        <Authentication username='xxxxx'
password='xxxx' scope='MNNN'/>
        <Instructions onfail='CONTINUE'/>
    </RequestHeader>
    <RequestBody>
        <Command status='REQUESTED'>
            <AddProductDef updateifexists='1'>
                <ProductDef
                    id='saw'
                    skumask='saw'
                    name='saw'
                description='A Circular Saw From Festo'
                shortdescription='Festo Circular Saw'
                    info='no comment'
                image='http://216.0.58.242/rmtools/fw132saw.jpg'
                largeimage='http://216.0.58.242/rmtools/fw132saw.jpg'
                    usualprice='145.00'
                    saleprice='135.00'
                    compareprice='215.00'
                    salelabel='HOT PRICE'
                    instock='1'
                    commplan='default'
                >
                    <AttributeDefList/>
                    <KeywordList/>
                </ProductDef>
            </AddProductDef>
        </Command>
        <Command status='REQUESTED'>
            <UpdateProductDef
                id='saw'
            image='http://216.0.58.242/rmtools/fw132saw.jpg'
            />
        </Command>
    </RequestBody>
</ManageInventory>
```

2. Host Manager

The Host Manager is the "Control Center" for Hosts. Here, a Host can track sales, design their store front, generate links to merchant products, get traffic/order reports, update account information, etc.

For a host to gain access to the host manager system, the host must be registered. FIG. 4 depicts a flow chart for a typical registration process. A host representative may initiate contact 410 with the system via a web interface. The signup process must collect basic host information 420, including the information necessary to pay the host a commission for purchases through his site, which is saved by the system 430. Optionally, a click agreement containing terms of use 440 may be presented requiring agreement 444 to proceed. If at some point the representative elects to cancel 425, 458 or reject the use agreement 448, he or she is returned to her point of entry 410. The system may then request the representative to select a user identification and a password 450. If the selected user identification is already in use 454, the representative may be prompted to select a user identification 450. The information associated with the host is stored 460, and the representative may proceed to the host manager system page 470.

Figure 10:
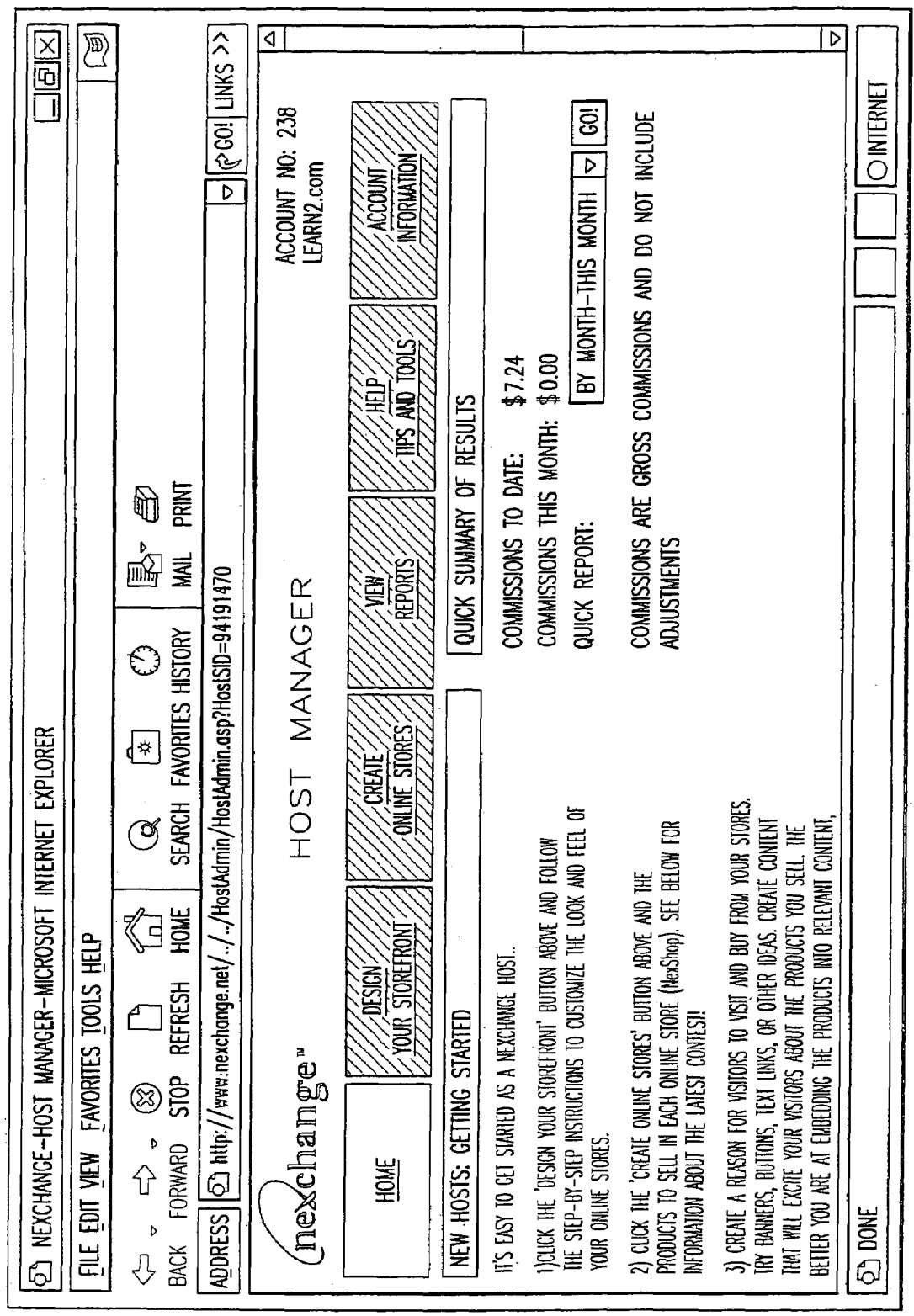
FIG. 10 is a screen capture of a Host Manager page in a preferred embodiment.

When a host logs in, they are taken directly to the Host Manager, as seen in FIG. 10, and assigned a Host Session ID (Host SID). All pages within the host system must request the Host Sid and call the ValidateHostSessionID function. If the session does not validate, the user is taken back to the Login screen.

This module contains the following submodules:

Account Information

This sub-module allows a host to maintain the following types of information:

Administrative Contact—name, address, phone
Payee Contact—name, address, phone, SSN
Site Information—site name, URL, description
Site Demographics—# of visitors, type of visitors, comments A host representative will be able to maintain basic host information, including the information needed to pay the host, and the host's password. FIG. 5 depicts a flow chart of the pages and actions in a typical maintenance process.

The Host Manager is the "Control Center" for Hosts. Here, a Host can track sales, design their store front, generate links to merchant products, get traffic/order reports, update account information, etc For a host to gain access to the host manager system, the host must be registered. FIG. 4 depicts a flow chart for a typical registration process. A host representative may initiate contact 410 with the system via a web interface. The signup process must collect basic host information 420, including the information necessary to pay the host a commission for purchases through his site, which is saved by the system 430. Optionally, a click agreement containing terms of use 440 may be presented requiring agreement 444 to proceed. If at some point the representative elects to cancel 425, 458 or reject the use agreement 448, he or she is returned to her point of entry 410. The system may then request the representative to select a user identification and a password 450. If the selected user identification is already in use 454, the representative may be prompted to select a user identification 450. The information associated with the host is stored 460, and the representative may proceed to the host manager system page 470.

When a host logs in, they are taken directly to the Host Manager, as seen in FIG. 10, and assigned a Host Session ID (Host SID). All pages within the host system must request the Host Sid and call the ValidateHostSessionID function. If the session does not validate, the user is taken back to the Login screen.

This module contains the following submodules:

Account Information

This sub-module allows a host to maintain the following types of information:

Administrative Contact—name, address, phone
Payee Contact—name, address, phone, SSN
Site Information—site name, URL, description
Site Demographics—# of visitors, type of visitors, comments A host representative will be able to maintain basic host information, including the information needed to pay the host, and the host's password. FIG. 5 depicts a flow chart of the pages and actions in a typical maintenance process. The representative has previously logged into the system to reach the host manager system page 470. From the host manager system, the representative selects to update her account 510 leading to a host information maintenance page 520. The representative can modify host information and, then choose to save or cancel the modification 530. In either case, the representative is returned to the host manger system page 470.

Store Front Design

The store front design is where the host's look and feel is captured. The look and feel is captured by selecting an example page the host, retrieving the sample page from the host, identifying the look and feel elements from the sample page and saving the identified look and feel elements. "Look and feel elements" include logos, colors, page layout, navigation systems, frames, 'mouse-over' effects, or other elements that are consistent through some or all of a Host's website. A typical system for accomplishing this task would include a data store for storing look and feel descriptions, a communication channel to the host whose look and feel is to be captured and a processor for executing the capture.

When a customer clicks on a host buying opportunity (link), the next page loaded will be a shopping page. However, this shopping page should retain the host's look and feel. This is accomplished by capturing the HTML text and images that comprise their look and feel and embed within it the shopping HTML content. Any relative URLs in the host look and feel may be changed to absolute URLs back to the host system.

In a preferred embodiment, there are five steps to a process capturing the host's look and feel, converting relative URLs to absolute URLs and validation of links.

Figure 6:
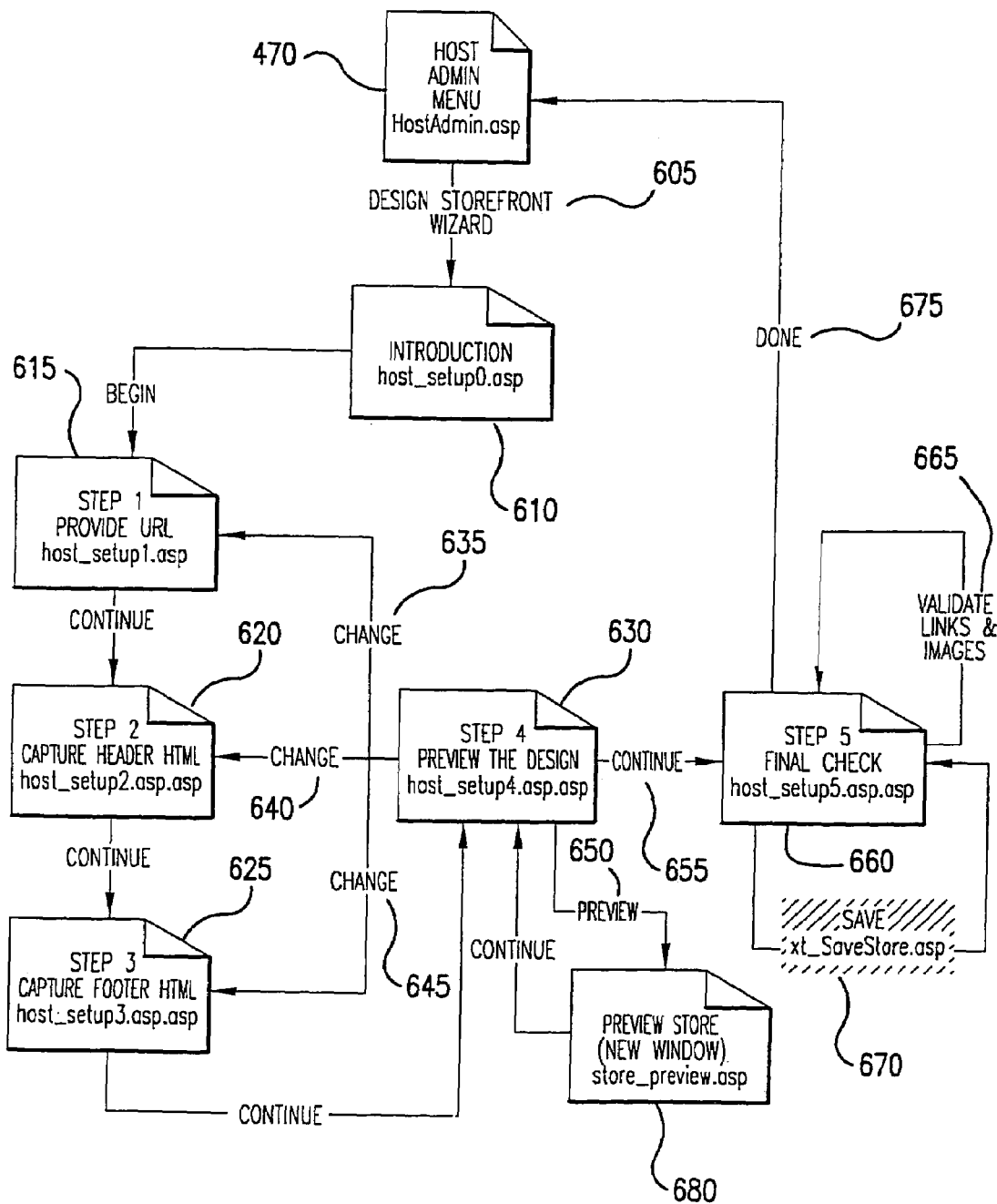
FIG. 6 is a flow chart of the pages and procedures in the host look and fee capture process.
Figure 11:
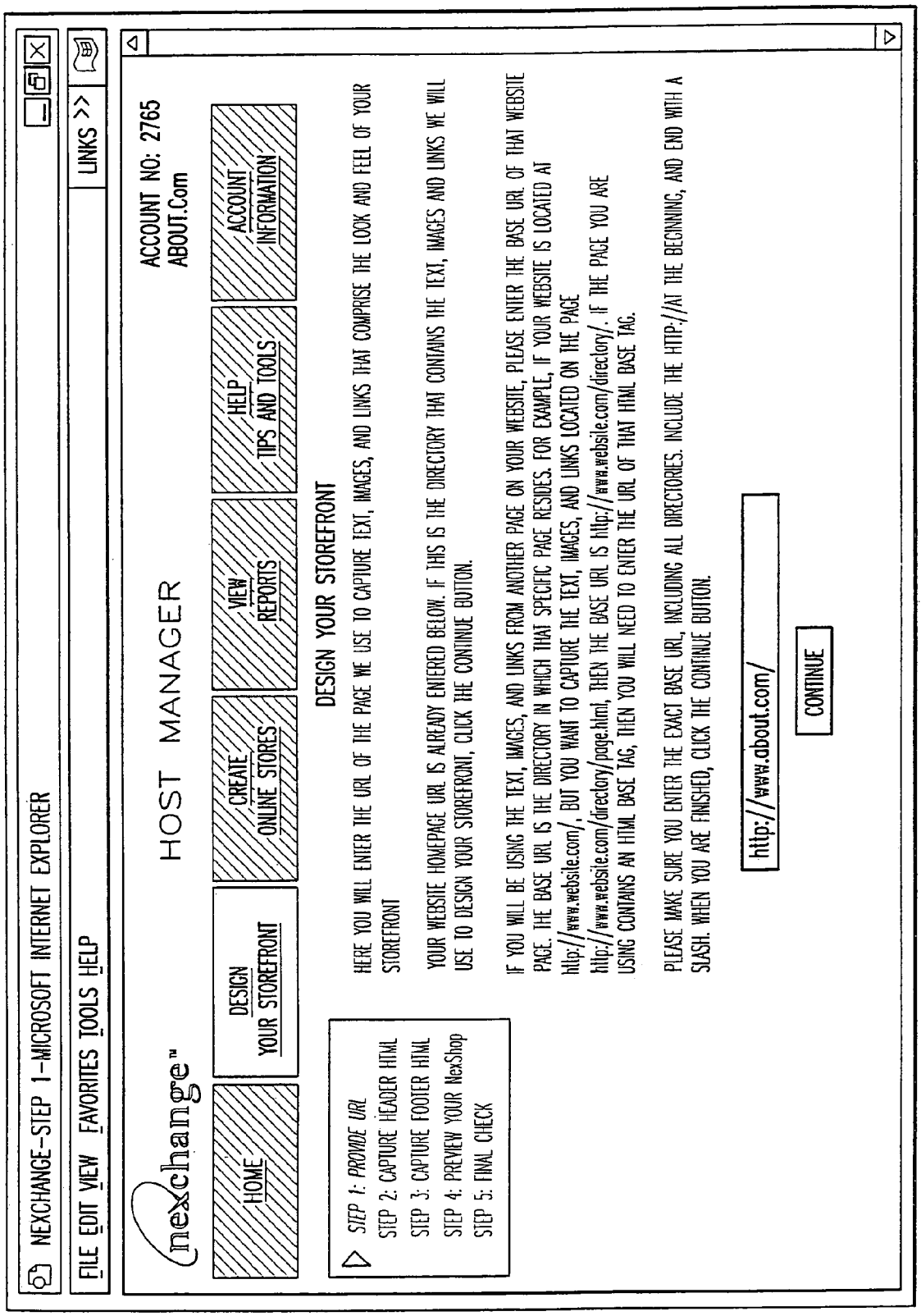
Figure 12:
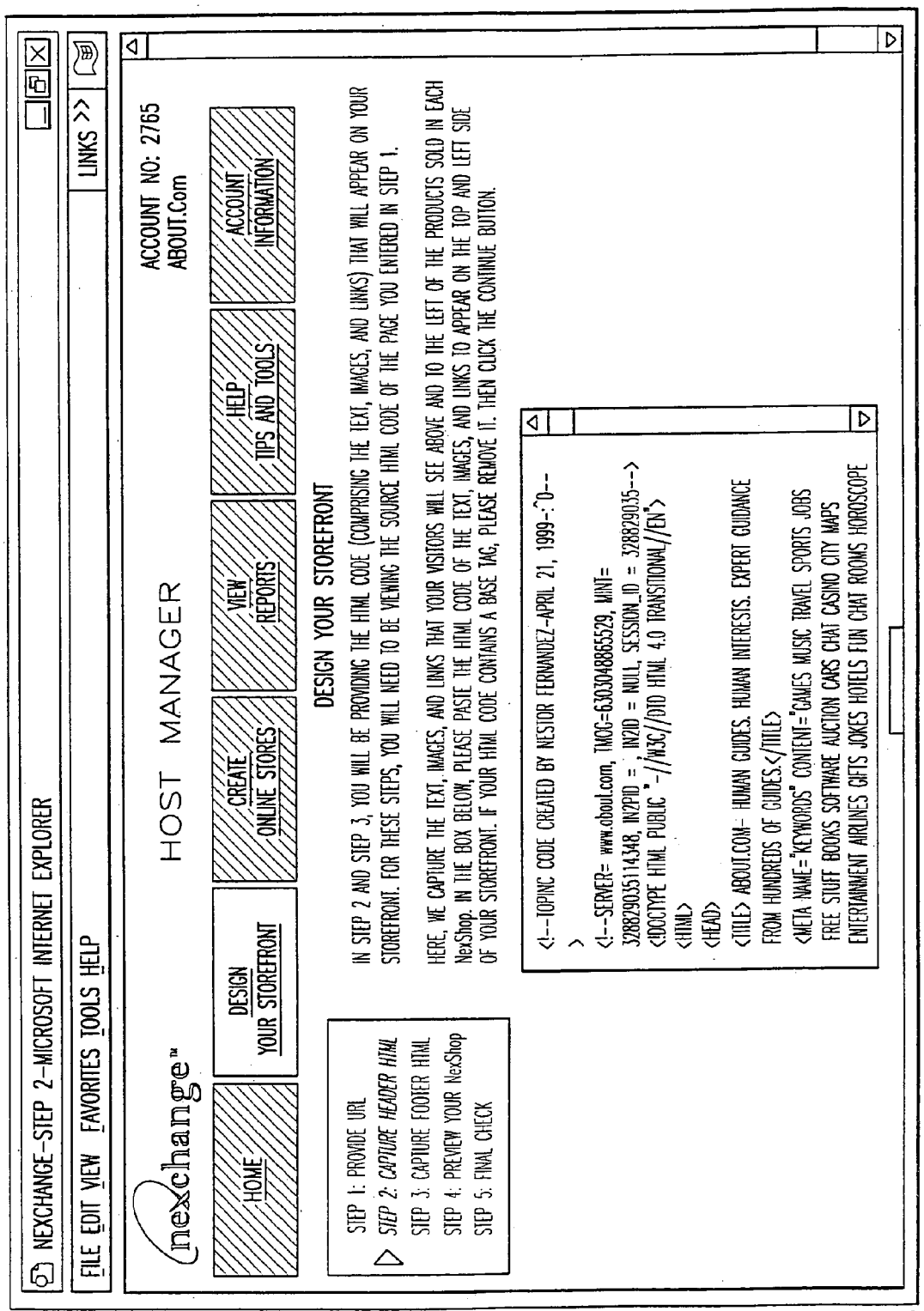
Figure 13:
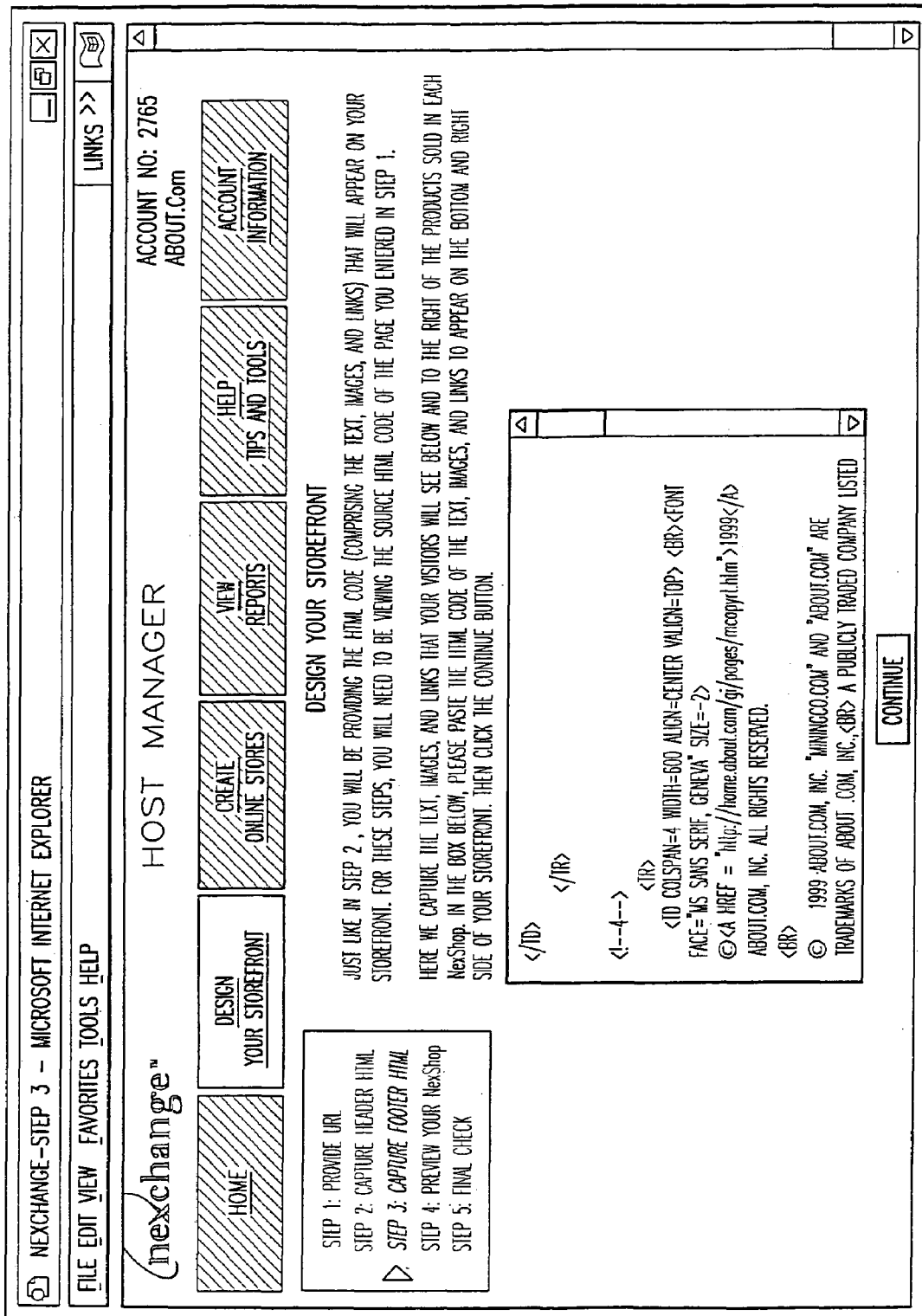
Figure 14:
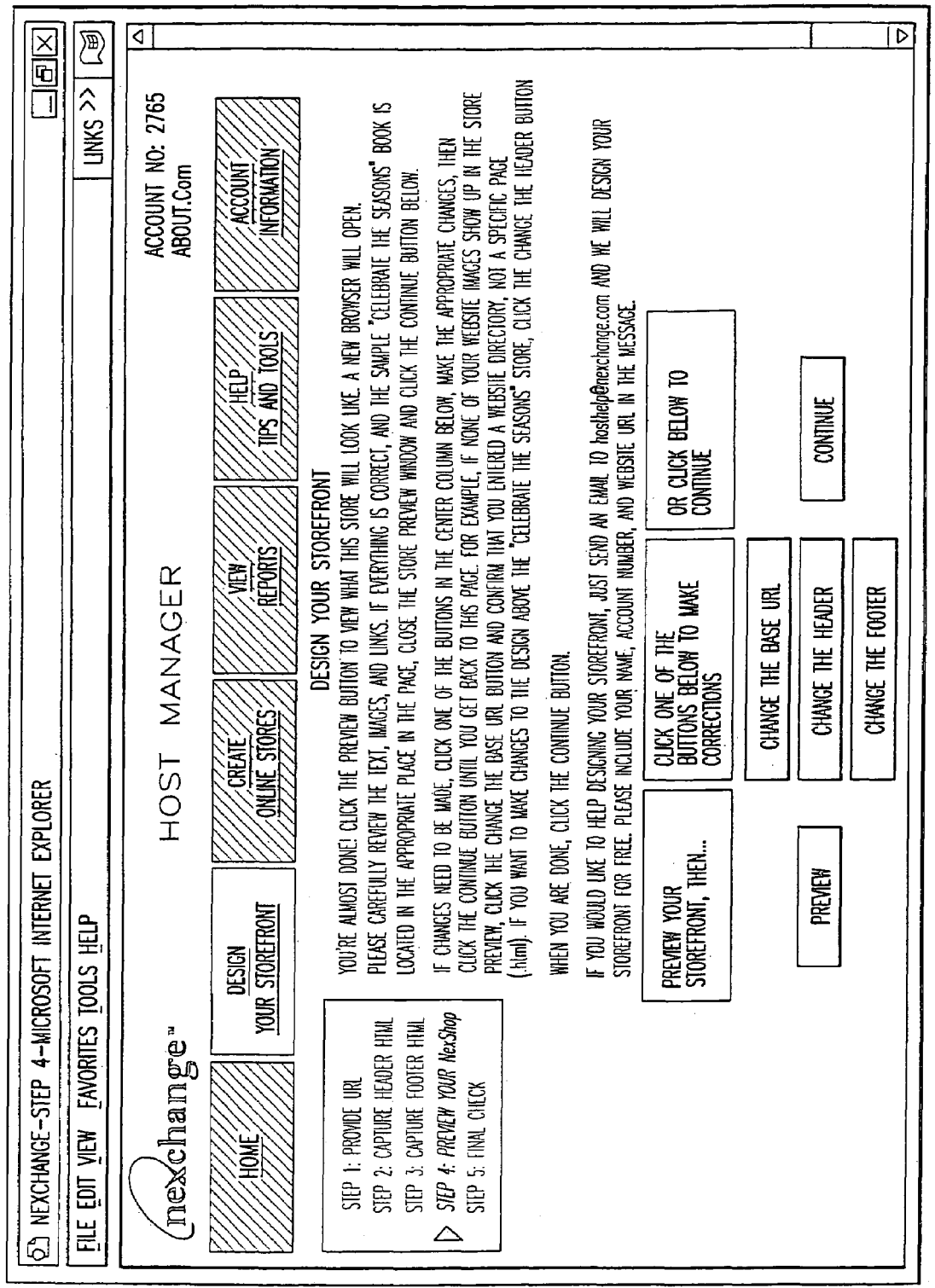
Figure 16:
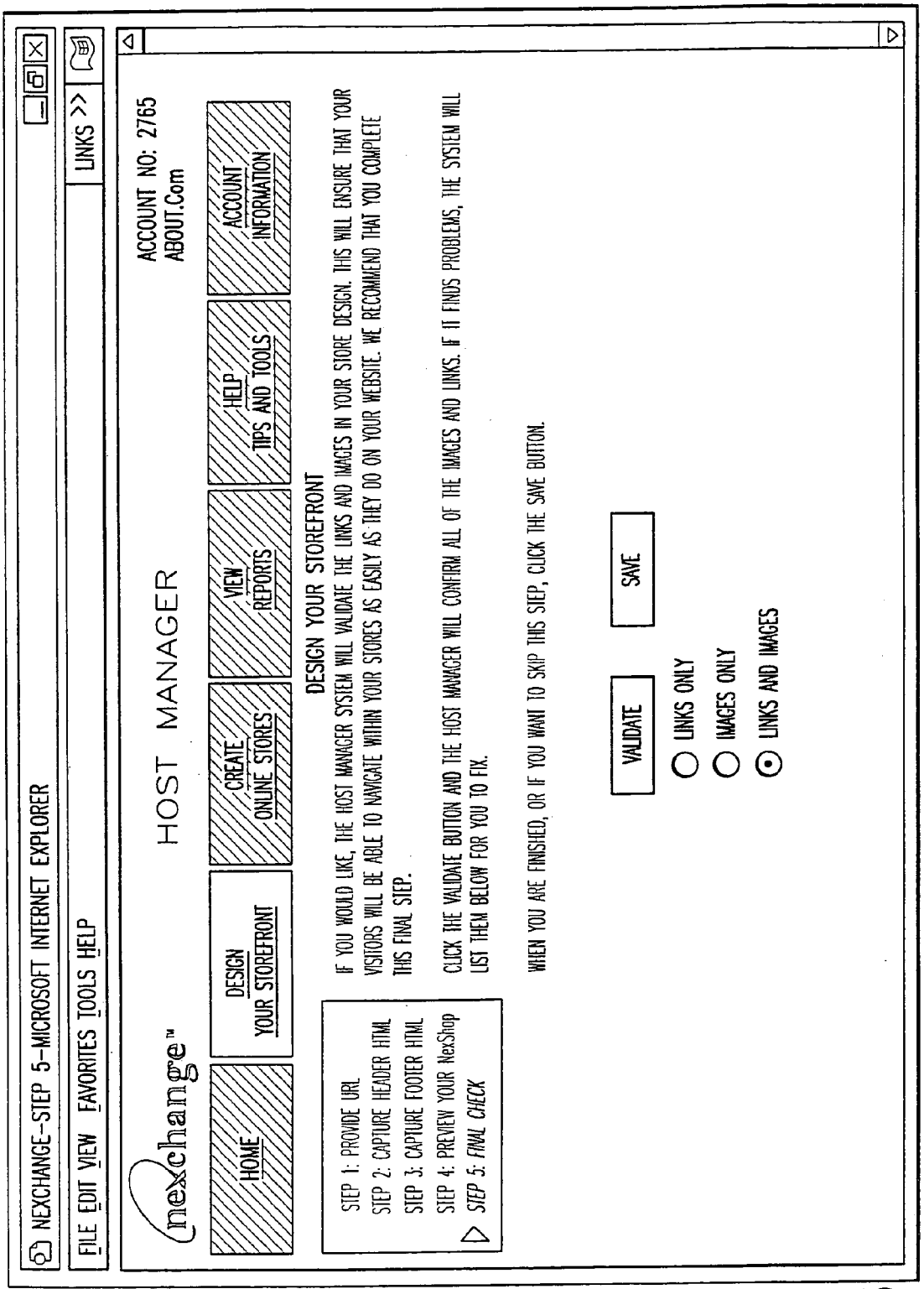
Figure 17:
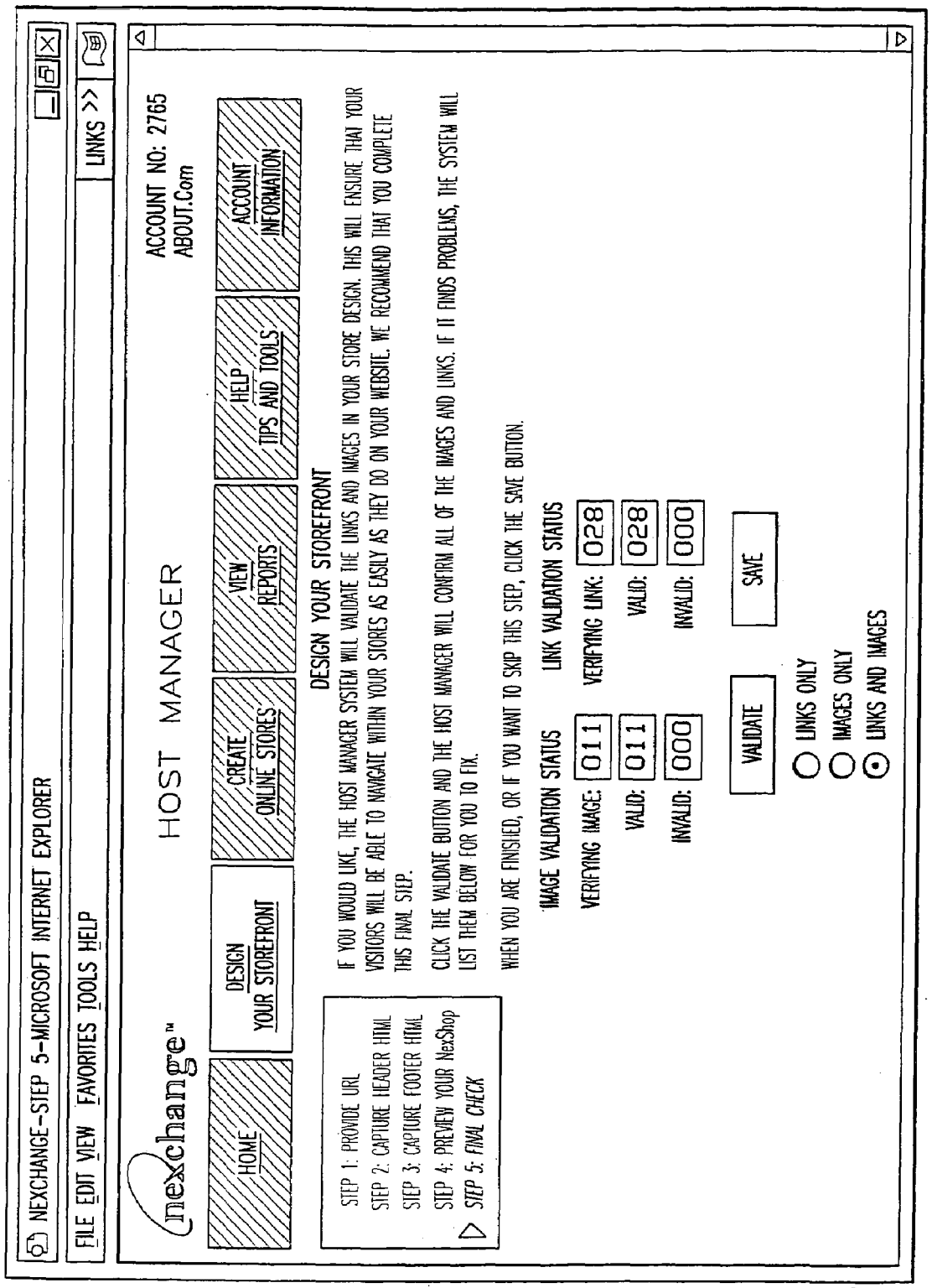
Figure 18:
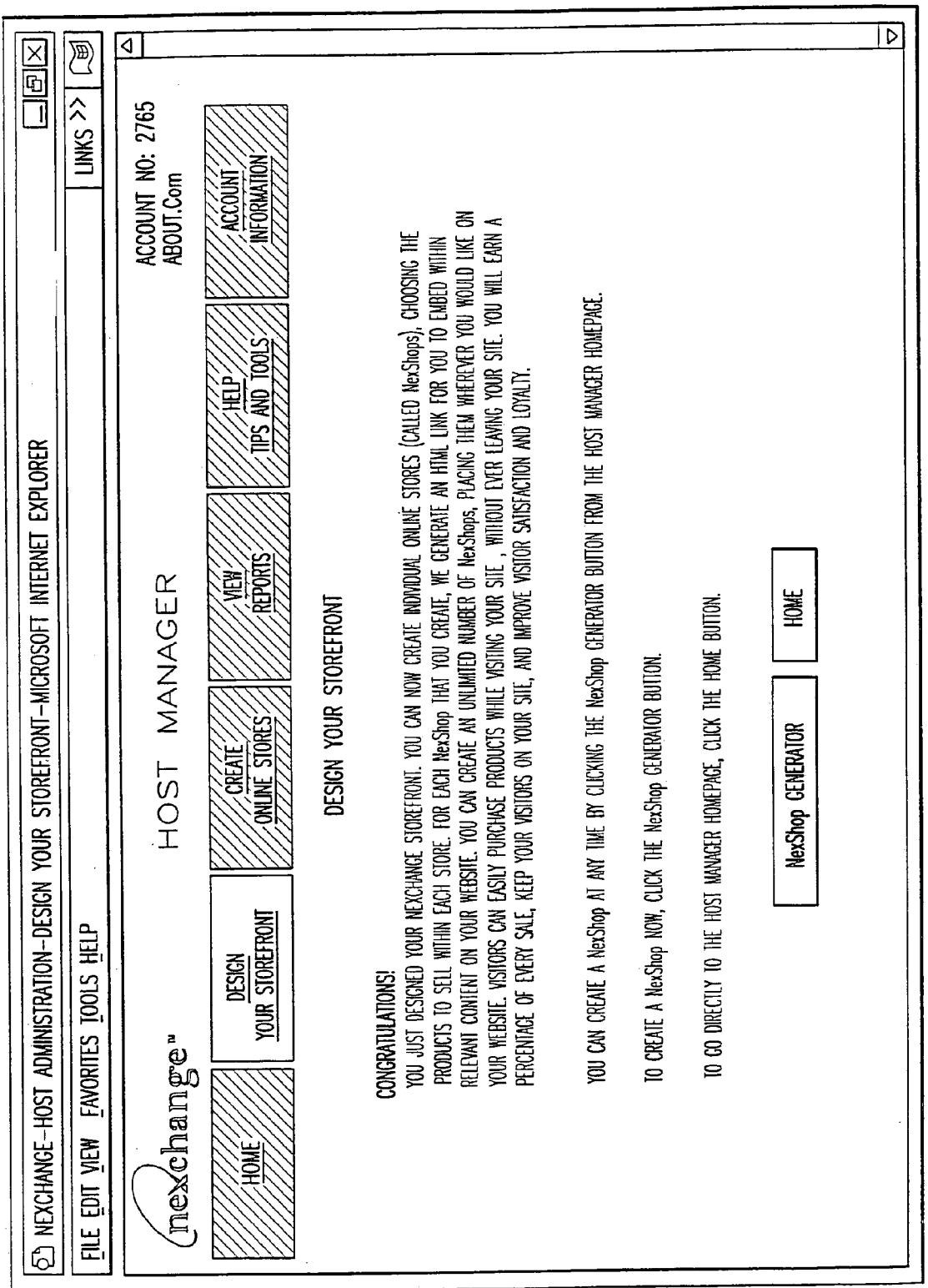

A host representative will be able to capture host look and feel information and to update host look and feel information through recapture. FIG. 6 depicts a flow chart of the pages and actions in a typical look and feel capture process. The representative has previously logged into the system to reach the host manager system page 470. From this page, the representative selects to initiate host look and feel capture through a design storefront wizard 605. An introduction page is presented explaining the process 610 from which the representative proceeds in the following manner:

Base URL 615—the URL used to convert relative links to absolute links, as seen in FIG. 11.

header 620—the HTML to be rendered BEFORE the shopping html. Selection may be made by code, as seen in FIG. 12, by graphical point and click selection or other suitable selection method.

footer 625—the HTML to be rendered AFTER the shopping html. Selection may be made by code, as seen in FIG. 13, by graphical point and click selection or other suitable selection method.

preview 630—shows what the shopping page will look like (nothing has been captured yet). From this preview page 630, as seen in FIG. 14, the representative may elect to return to earlier stage to perform a change 635, 640 or 645 of base URL, header or footer respectively. The user may also have access to a preview 650 with example content included to demonstrate a typical page with both content and look and feel 680, as seen in FIG. 15. From the generic preview page 630, the representative may choose to continue 655 with finalizing the look and feel 660.

final check 660—finalize the captured look and feel, as seen in FIG. 16, this page may allow validation of links and images and offer to save the captured look and feel. Once validation, if any has been performed, and the look and feel has been saved, the process completes 675.

validation 665—validate the link and image URLs in the header and footer HTML. FIG. 17 displays the screen capture of page that could be used to display validation progress.

save 670—Actually captures, processes and saves the storefront information. A completion page such as seen in FIG. 18 may be displayed.

For security reasons, javascript is accepted but applets are stripped out in the preferred embodiment.

Link Generator

The Link Generator allows host to create and maintain the shopping opportunities that they can then place on their site. Each Link is assigned a unique Link ID. The Link ID identifies who the host is, who the merchant is, and what commerce object (catalog, category, product or dynamic selection) is linked to.

The first time a host builds a Link to a merchant's product, category or catalog, an approval of that host for that merchant may be made. Until the host is approved, they cannot see the Link ID that has been assigned to the newly created Link.

The code the host embeds on their web site is as follows:

```
<!-- BEGIN NEXCHANGE LINK -->
<!-- For more information go to http://www.nexchange.com -->
<!-- The following 2 lines MUST NOT BE CHANGED to ensure proper crediting -->
<IMG BORDER='0' SRC='http://www.nexchange.net/img.asp?LinkID=xxxx'>
<a href='http://www.nexchange.net/route.asp?LinkID=xxxx'>
<!-- Substitute your own text or image below -->
** YOUR TEXT OR IMAGE HERE **</a>
<!-- END NEXCHANGE LINK -->
```

There are several points to note here:

The image src (img.asp) is actually an ASP program that returns a single transparent pixel. This is used to track impressions (how many times the link was displayed on the host site).

The route.asp page is a page that routes the customer to the shopping page. As additional servers are added, this will become very important for load balancing.

The 'xxxx' for the LinkID='xxxx' is the Link ID assigned to the Link in the Link Generator.

Figure 7:
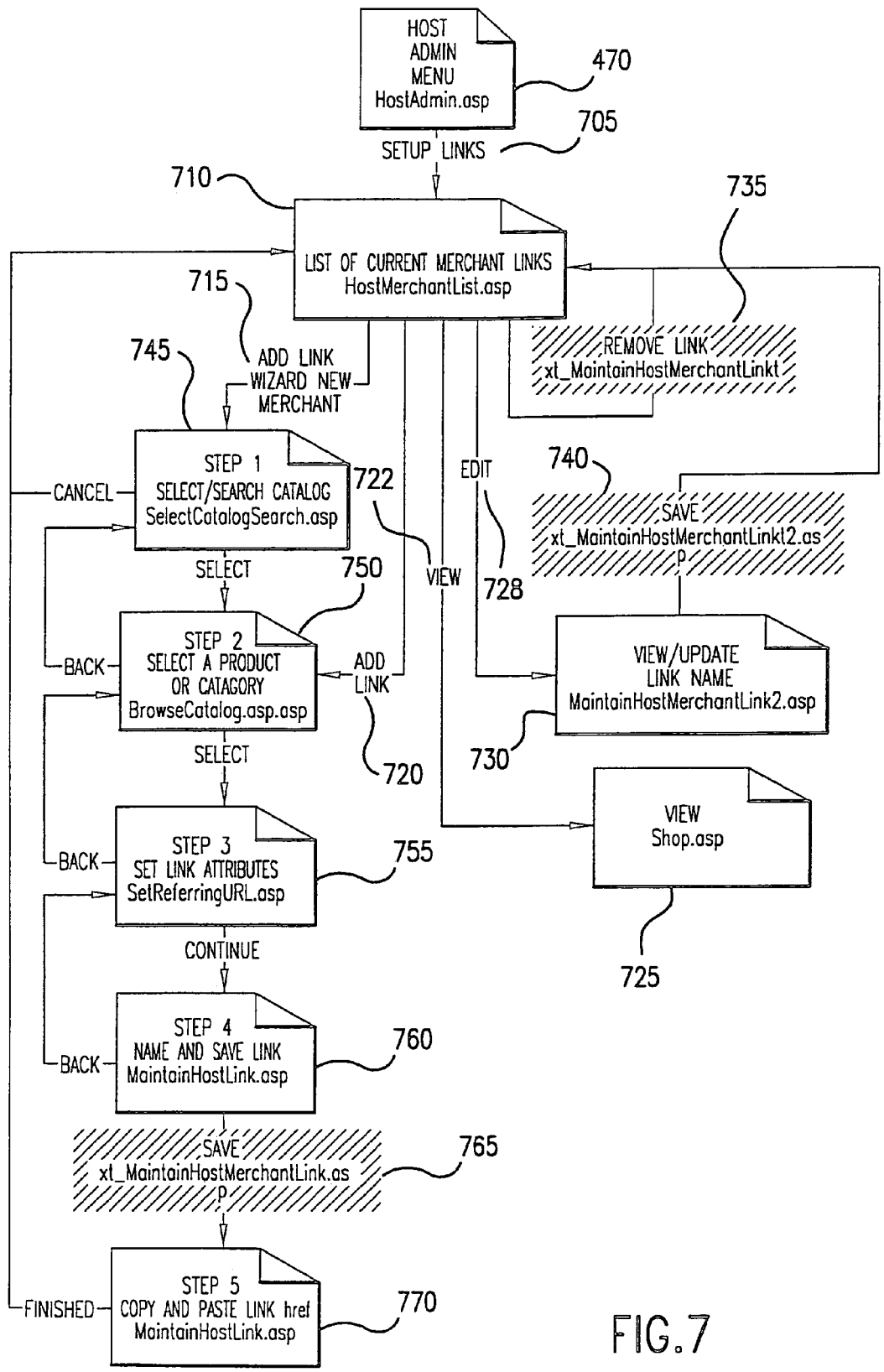
FIG. 7 is a flow chart of the pages and procedures in the host link generation process.

A host representative will be able to generate links to commerce objects. FIG. 7 depicts a flow chart of the pages and actions in a typical link generation process. The representative has previously logged into the system to reach the host manager system page 470. From this page, the representative selects to generate links 705, which transfers her to a page containing a list of all previously generated links for that host 710.

From this page, the representative may choose among several options: view an existing link 722, remove an existing link 735, edit an existing link 728 or add a new link to either a merchant with whom a link already exists 720 or a merchant without an existing link 715. In viewing an existing link 722, the page containing the link may optionally displayed in a separate window 725; as a consequence, the representative could continue to interact with the list of available links page 710 in the primary window. The representative could select a link for removal 735 and, upon removal, return to the list of links page 710. The representative may choose to edit an existing link 728 leading to a link modification page 730. After modifying the link, the new link information would be saved 740, and the representative would return to the list of available links 710.

Figure 8:
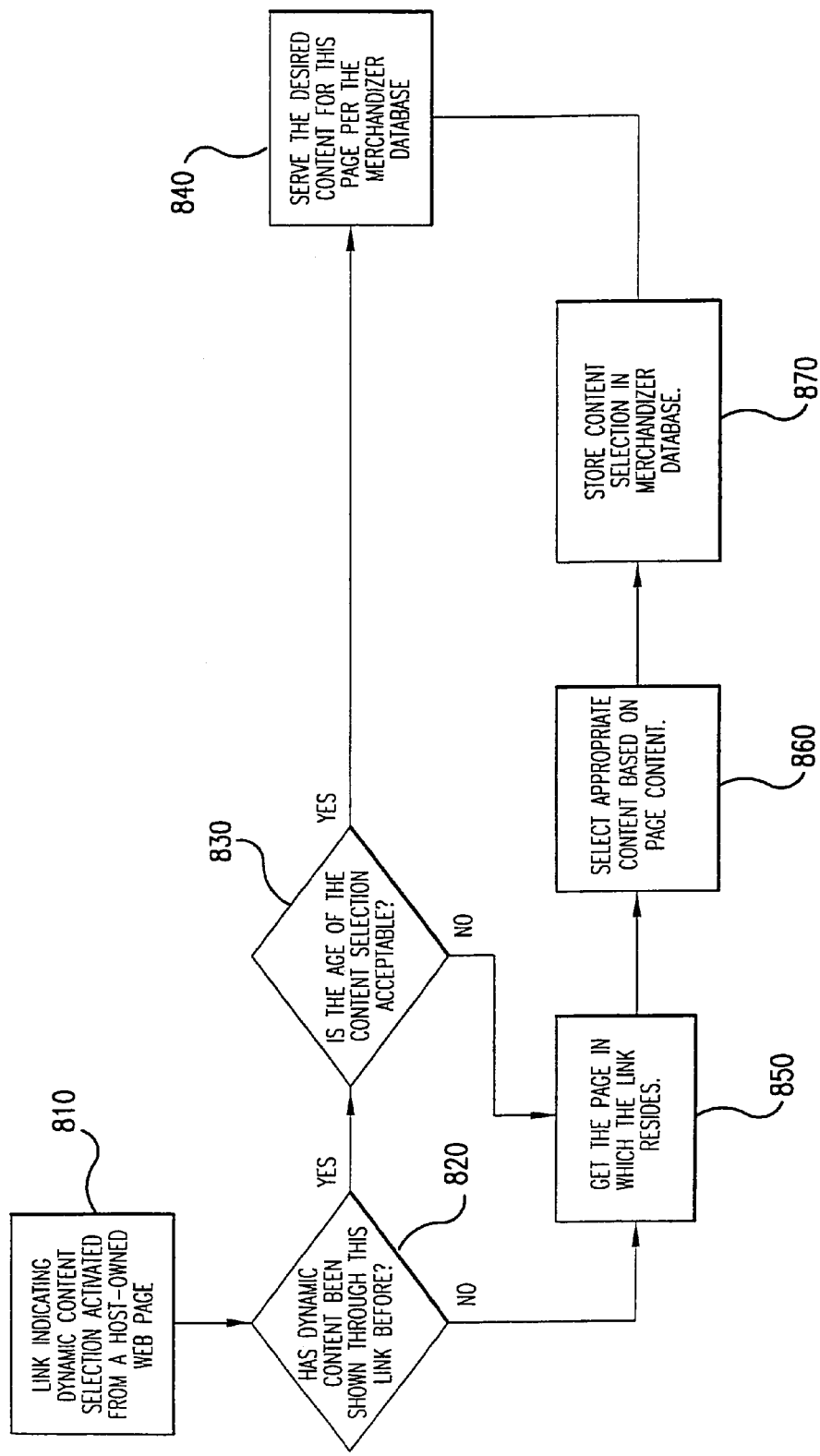
FIG. 8 is a flow chart of the dynamic content selection and presentation process.

In adding a new link, a distinction may be made whether a link is made to a merchant to whom the host has previously linked 720 or to a merchant to whom a previous link does not exist 715. In the latter case, an extra optional step may be involved to approve the host with respect to the new merchant as part of the catalog selection process 745. In other embodiments, such a distinction need not be made. In linking to a merchant to whom a previous link does exist 720, a catalog may implicitly be selected. In either situation, the creation process continues by allowing the representative to choose a commerce object to associate with the link 750. Such a commerce object will be a product, a product category, a catalog or an indication that a product, product category or catalog should be chosen dynamically. From this page, the representative may go back to the catalog selection page 745 or proceed with setting link attributes 755 such as the destination upon return from the link (e.g. the point of departure into the e-commerce page or a destination designated by the representative). From this page 755, the representative can return to the commerce object selection page 750 or continue forward with naming and saving the new link 760. Upon completion of naming and saving page 760, the link is saved to the system database 765, and the representative is provided with a link to include within a page on the host website 770. After cancellation at any time, or upon completion, the representative is returned to the list of available links page 710.

Where a host representative chooses a dynamic indicator as the commerce object, the specific content will be chosen contextually based upon the content of the page that includes the link. In a preferred embodiment, keywords in the page are cross-reference with available catalogs, product categories and products to choose the appropriate content for the destination page associated with the link. FIG. 8 is a flow chart of the selection process in such a preferred embodiment.

A visitor is viewing the host page including a link associated with a dynamic selection commerce object 810. The visitor activates the link. Receiving the activation, a determination is made as to whether content has previously been dynamically selected for the activated link 820. If yes, a second determination is made as to whether the previously dynamically selected content is current 830. If this is answered in the affirmative, a page is constructed with the previously dynamically selected content along with the look and feel associated with the host from which the link originated 840.

If either determination is negative, the host page including the link is retrieved 850. The page content is analyzed, and based upon the analysis, content for the link destination is selected 860. The selected content is cached for potential future use 870. Finally, a page is constructed with the dynamically selected content along with the look and feel associated with the host from which the link originated 840. The analysis in 860 may take a variety of forms including, in a preferred embodiment, identification of marked keywords. In another embodiment, keywords may be dynamically determined using word count statistics.

In a more elaborate system, the retrieval process might encompass not only the page containing the link but also other pages linked to the page of link origin. Keywords or word count analysis could be used to determine context based upon the aggregation of pages retrieved. In a further embodiment, differing weights could be given based upon the source of the keyword identified; keywords from the page of origin would have a greater weight than keywords derived from pages one link away.

Reports

A valid host representative will have on-demand access to a report showing visits to their links and sales. The report will be scoped by date range. Visits can be summarized by merchant and by link. Sales can be summarized by merchant and by link.

Figure 21:
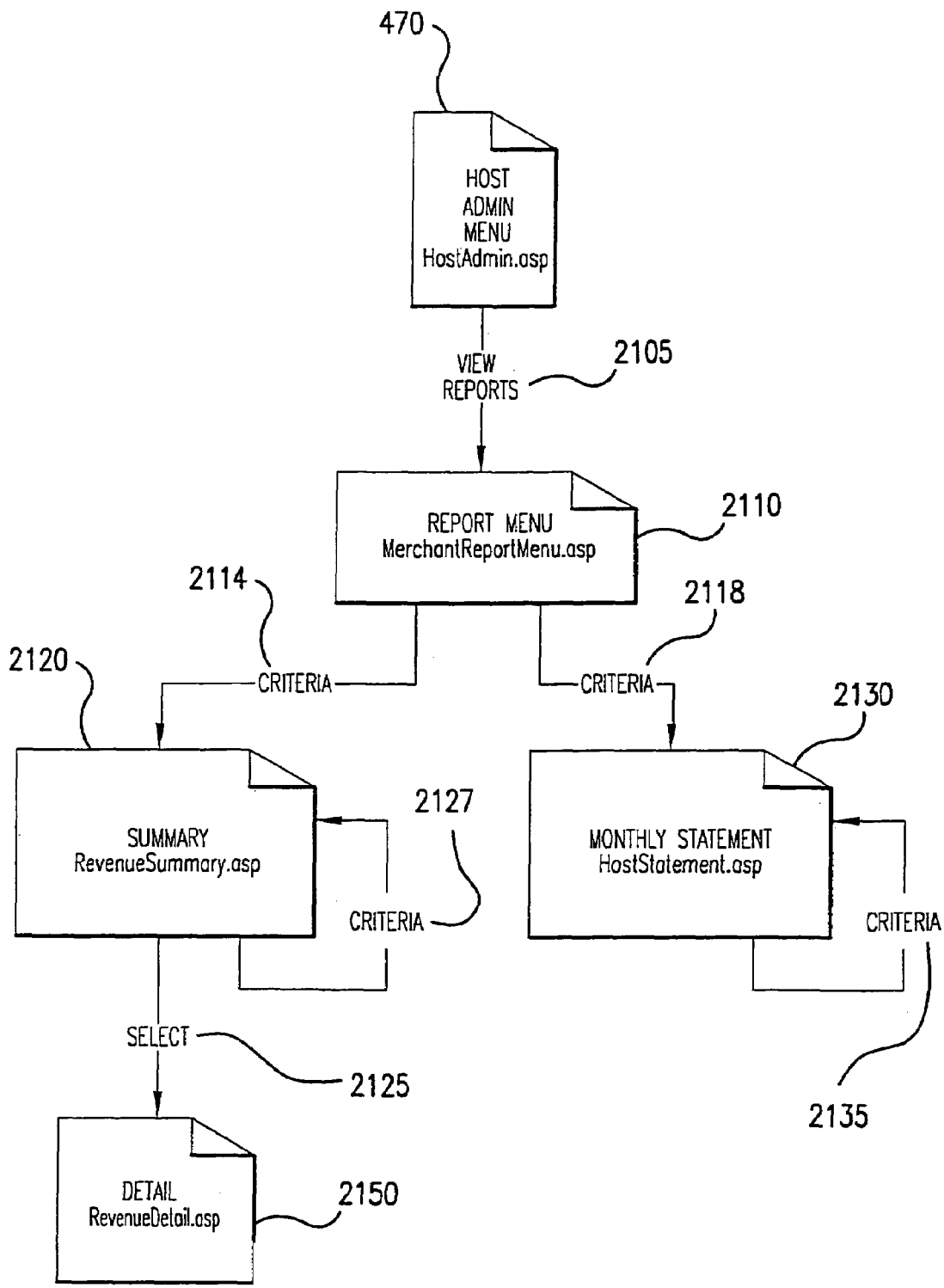
FIG. 21 is a flow chart of the pages and procedures in the host view reports process.

As illustrated in FIG. 21, a host representative begins at the Host Manager page 470. She selects the view reports option 2105 to view the report menu page 2110. From the reports menu page 2110, she may enter criteria 2114, 2118 leading respectively to a revenue summary page 2120 or a monthly statement page 2130. From the monthly statement page 2130, she may change criteria 2135 to view a revised monthly statement 2130 or return to the report menu 2110. From the revenue summary page 2120, she may select a specific item 2125 for receiving a detailed revenue page 2150, alter the criteria 2127 to receive a revised revenue summary 2120, or return to the reports menu page 2110. From the detailed revenue page 2150, she may return to the revenue summary page 2120.

The following reports are available for the hosts to track their results:

Revenue Summary by Month
   This report provides sales and traffic information summarized by month. Data includes number of sessions, number of orders, gross and net sales, etc. Allows 'Drill Down' to daily totals.

Revenue Summary by Merchant
   This report provides sales and traffic information summarized by merchant. Data includes number of sessions, number of orders, gross and net sales, etc.

Revenue Summary by Link
   This report provides sales and traffic information summarized by Link. Data includes number of sessions, number of orders, gross and net sales, etc.

3. Shopping

The shopping module is the part of the application that allows customers to find, search, select and buy a product. There is also a return product section accessible to the customer after the order has been placed.

Figure 19:
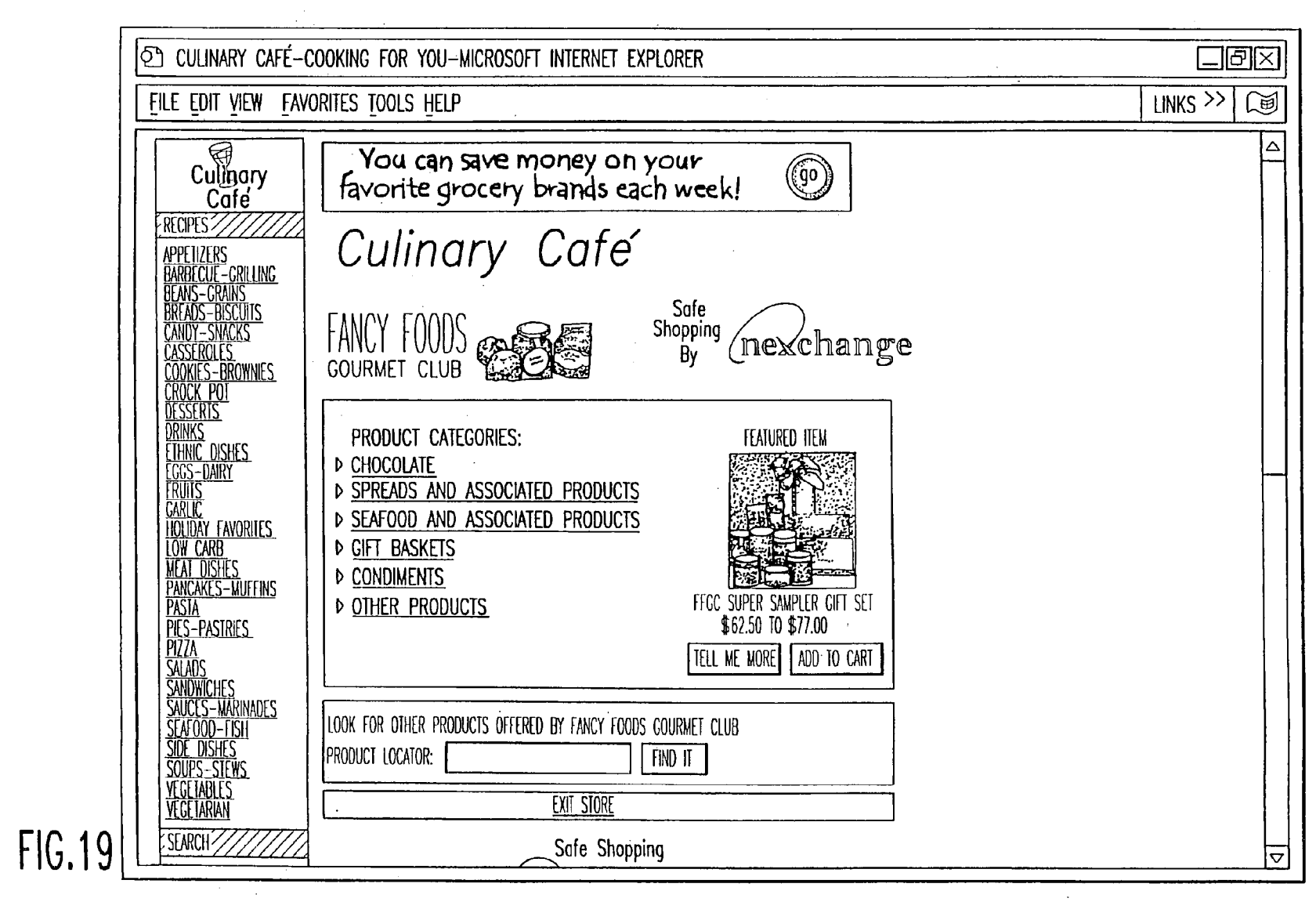
Figure 22:
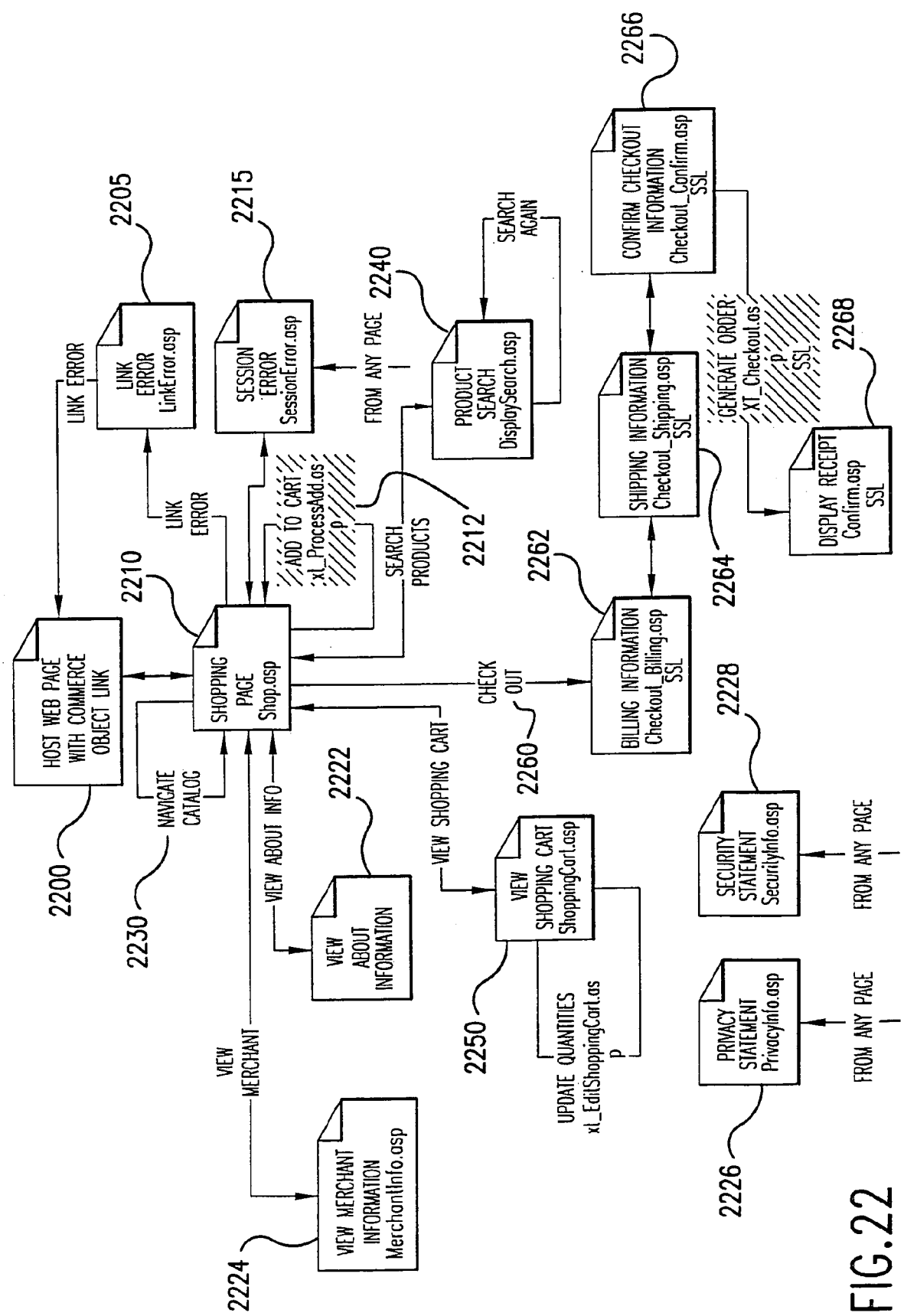
FIG. 22 is a flow chart of the pages and procedures in the shopping process.

Shopping is the part of the application that the general public will encounter. FIG. 19 displays a screen capture of a typical shopping page in a preferred embodiment. FIG. 22 depicts pages and procedures in a shopping process as implemented in a preferred embodiment.

The customer was on a host site and saw a link to buy something created via the Link generator 2200. When he or she clicks on the link, he or she is taken to the shopping page parameterized with the Link ID 2210. If an error occurs during this transition, the visitor is routed to a link error page 2205.

A variety of generic information may be available from any shopping page within the system. Such information could include information about the e-commerce outsource provider 2222, information about the merchant offering the current commerce object 2224, information about an involved party's privacy policy 2226, or information about an involved party's security policy 2228.

Customers will be able to browse a merchant's catalogue and place items in their shopping cart 2212. When the customer is ready to checkout 2260, the system will acquire payment information 2262 and shipping information 2264 from the user, confirm this information 2266, and execute the transaction. The receipt including a URL that can be used to track the order status (e.g.—it could be bookmarked) will be displayed to the customer 2268. By visiting the URL provided upon checkout from the shopping experience, the customer can check the status of their order, initiate returns, and check on their return status.

This module contains the following submodules:

Session

Each time a new shopping session is started, a customer session is created for the shopper. This Customer Session is assigned a Session ID (SID). All pages within the shopping system must request the SID and call the ValidateSessionID function. At any time if a session error occurs, a session error page 2215 may be presented.

Unlike the merchant and host sessions, the shopping session is persistent. The session information retained is what the customer has placed in the cart and if they have checked out. The SID is also written back to the customers browser as a cookie. If a customer returns to the Shopping page an attempt will be made to use the last session they had. It will only be reused if the ALL of the following are true:

The host the customer is coming from now is the same host as in the previous session
   The merchant for the current link is the same as the merchant in the previous session
   The previous session was not "Checked Out".
   The session is not older than a certain age.

Product Search and Selection

The main shopping page begins at the entry point that the host used to build the Link. This can be to a specific product, a category of products, a category of sub-categories, a complete catalog or a dynamically selected destination. However, no matter what entry point was chosen, the customer can navigate to every item contained in the merchant catalog used for the Link serving as the customer's entry point to the shopping. The customer may browse the catalog 2230 or search for a specific product or product category 2240.

Shopping Cart

The Shopping Cart is the main information saved in a customer session. As a customer places products in the shopping cart, we retain information such as:

name of the product
   price of the product
   any attributes (size, color, etc)
   host commission rate
   merchant revenue percent This information must be stored redundantly in the shopping cart because the price, name, etc may change later and the values at the time of purchase need to be retained. The shopping cart interface also allows the shopper to remove a product and/or change the quantity through a view shopping cart page 2250.

Check Out

The check out process is separated into two distinct pieces.

Order Capture
   Credit Validation

Order capture is the process of obtaining the customers billing and shipping information and creating a pending order. The credit card information is checked to make sure it is a valid number for the card type but it is not actually processed with a credit card authorization service (i.e. CyberCash). The order is accepted, assigned an order id and the customer is given an on screen and email confirmation. The pending order has a status of new.

The credit validation process happens sometime after the order capture has occurred. The customer's billing information is sent to the authorization service. The pending order now has the status of authorized.

If the card is validated, the order is accepted and placed into the The order table. The pending order has a status of accepted. If the billing information fails validation, the pending order status is set to rejected and an email is sent to the customer informing that the credit card information could not be validated.

4. System Manager

The System Manager is the "Control Center" for administrators. The administrator can monitor the day-to-day activities and status of the system. When an administrator logs in, he or she is taken directly to the System Manager and assigned a Nexchange Session ID (NexchangeSID). All pages within the System Manager system must request the NexchangeSID and call the ValidateNexchangeSessionID function. If the session does not validate, the user is taken back to the Login screen. Access to administration functions will require authentication using the name and password for a valid administration account.

Figure 20:
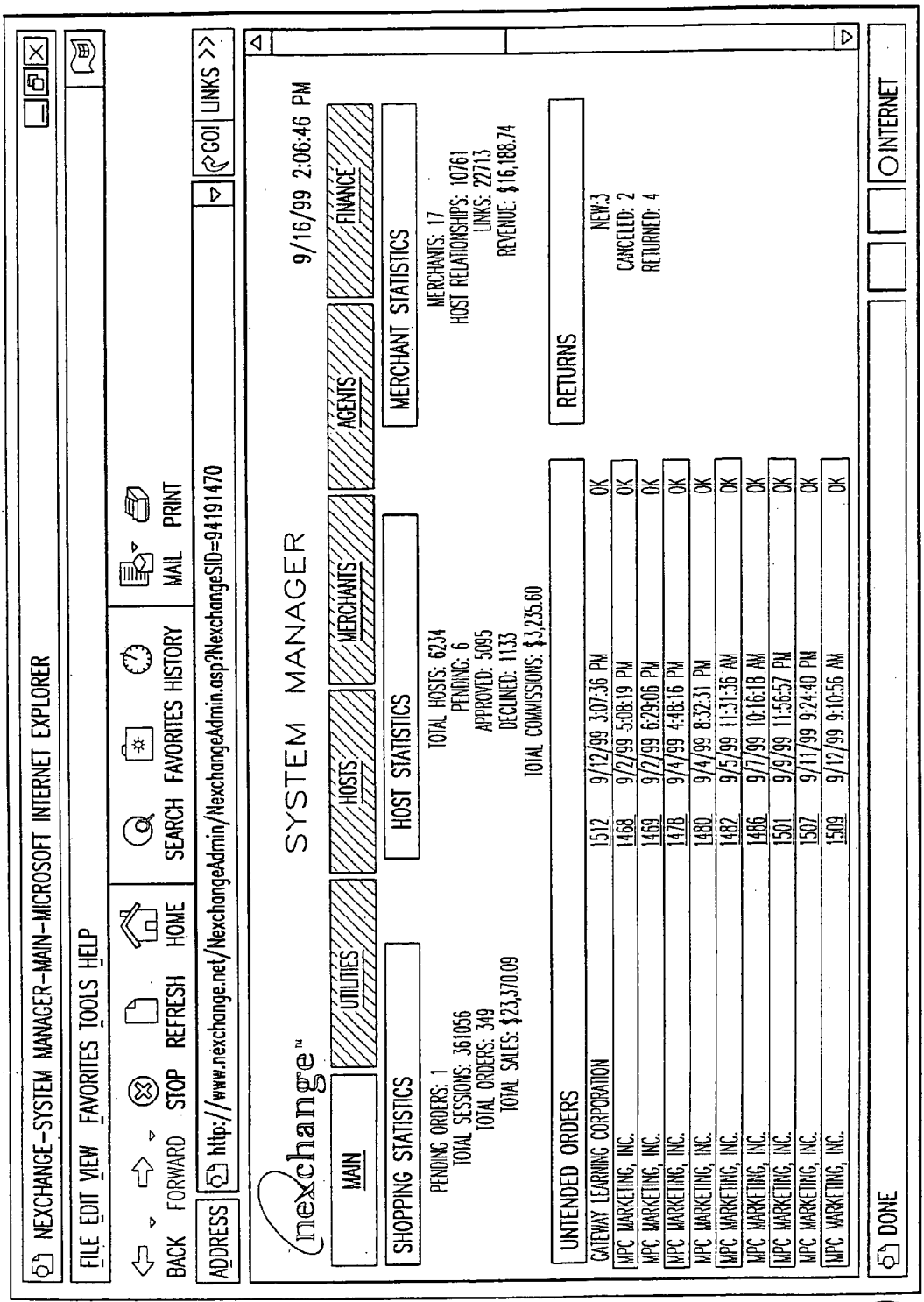
FIG. 20 is a screen capture of a System Manager page in a preferred embodiment.

The home/main page of the System Manager provides a quick summary of the current system status; a screen capture of a typical main page in a preferred embodiment is seen in FIG. 20. This summary includes pending orders, orders, host statistics, merchant statistics and an unattended orders list.

An administrator will be able to configure a hosts or merchant's payment policy. This includes specifications for any holdbacks, and a method for calculating commission/payment. At the request of a merchant, an administrator will be able to configure the system to reject all shopping traffic from a particular host-merchant arrangement. The host and merchant contacts will be notified via email. An administrator will also be able to activate or deactivate a host. The system will reject shopping traffic from inactive hosts. When a host's status is changed, the host contact will be notified via email. An administrator will configure the system to enforce system-wide policies. System-wide policies include the number of days allowed for returns.

The system will periodically run an audit process and report on situations of concern. For example, an audit could search for orders that have not been serviced for a certain period of time. The system may also report on possible security situations such as an inordinate number of account lockout incidents.

This module contains the following submodules:
Utilities
The following utilities are available:
  List Pending Orders
  List Orders
  List Rejected Orders
  List Returns
Host
The following actions are available:
  List Promos
  List Hosts
  Maintain Host Tiers
  Host with Pending Merchants
Merchant
The following actions are available:
  List Merchants
  Copy a Category
  Find Category Links
  Add a New Merchant
  Maintain Brands Application Server Tier The business functionality is provided via "application servers". An application server will consist of one or more of the business modules, wrapped with an appropriate middleware adapter. This arrangement allows delivery of services via many different mechanisms. For example, if it becomes desirable to serve some functions to a Java client, a Java Remote Method Invocation (RMI) version of an application server could be built. The new server could be developed rapidly because only an RMI "wrapper" would need to be developed, while the application logic would be reused. In a preferred embodiment, this layer consists of a set of core C++ software modules that encapsulate business functions.

Figure 3:
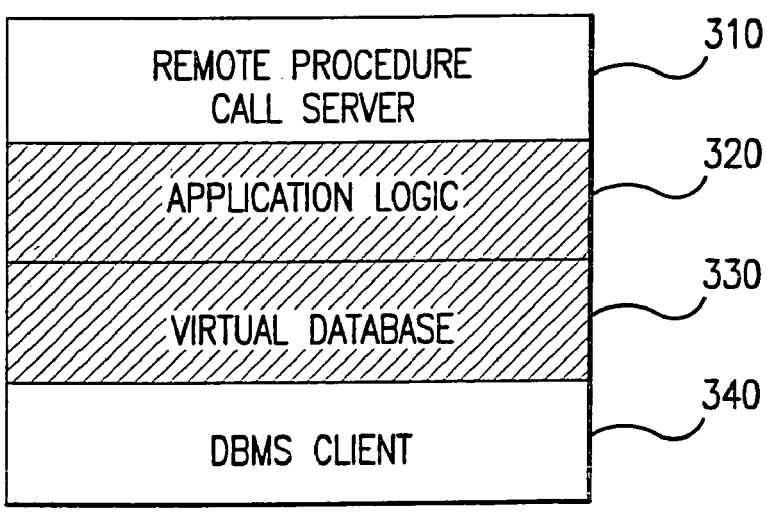
FIG. 3 illustrates the software architecture of the application server layer.

The Application Server tier may run on one or more application server computers. The application servers are stateless. This means that, for two application servers serving the same functionality, "one is as good as another". In the event of failure, a client's requests may be handled by a different server than before the failure. Since it does not matter which server services a request, routing is greatly simplified. The stateless server approach also provides excellent fault tolerance since all application servers can back each other up. Use of a combination of "sticky routing" and caching to significantly ameliorate any detrimental performance implications of the stateless approach, while preserving most of the benefit. Once a client begins using a particular service, the system will show a preference for routing future requests from that client to the same server. The servers maintain a cache recently used data and will only access the database if the desired item cannot be used in cache. Since the routing is sticky, the client's data will often be in cache, and in many cases, no database access will be required. Should the client be routed to a new server, the session data can be retrieved from the database as occurs in the "vanilla" stateless model. In a preferred embodiment, the functionality of this layer utilizes one or more low cost server systems 125a–125d running a suitable operating system such as Microsoft Windows NT. This tier is also composed of several software layers as illustrated in FIG. 3:

Remote Procedure Call Server 310. This software provides connectivity to the Web Server layer and is not application dependent. In a preferred embodiment, this software layer is the Objectstore Component Server.

Application Logic 320. This software encapsulates the business functionality. The design of this software layer and the various application servers is more fully described below.

Virtual Database 330. The virtual database layer allows the application data to be distributed across multiple Database servers while insulating the application layer from the physical storage configuration. The virtual database contains a table that maps object types to physical databases. All database objects or records of a given type are distributed across the permissible databases. Databases can be added while the system is live to permit expansion onto new servers. Overburdened databases can be closed to prevent assignment of new data to them. Databases can be moved to different physical servers. All stored objects are referenced by a handle which is unaffected by the physical location of the referenced data. The virtual database layer also permits a collection of objects distributed across multiple servers to be indexed and searched.

DBMS Client 340. This software provides access to data stored in the databases. In a preferred embodiment, the DBMS client is Object Design's Objectstore client. All Objectstore clients contain a cache of recently used database pages. An optimistic locking scheme is used to ensure cache consistency. The caching scheme is very effective in the present invention because it is optimized for many readers and few writers. In a preferred embodiment, the application server layer includes the following eight application servers:

1. Cashier—Collects checkout information: billing info, shipping preferences, etc.

The Cashier server is analogous to a cashier in a "bricks and mortar" store. The cashier's responsibilities are listed below:

Collecting Information Necessary To Complete a Sale. This information will include billing information, shipping address(es) and preferred shipping methods. In some cases, the information to be collected may depend on the contents of the order. The cashier will also access the appropriate merchant policy information to assist in determining what data should be collected.

Providing an Itemized Account of the Total. Upon receiving the necessary data, the cashier will compute the applicable taxes, shipping charges, etc, and provide an itemized account of the order total.

Execute the Sale. Upon request, the cashier will execute the sale. A copy of the relevant information will be sent to the credit processor. When the credit processor approves the orders, the cashier will break the customer's order into individual merchant orders and forward them to the Merchants' Order Tracking server. The cashier will also post a record to the Ledger at this time.

2. Catalog—Houses product hierarchies. Conducts product searches.

The catalog is an arrangement of product information. The catalog server supports a hierarchical browsing mode and various searching functions. Its responsibilities are listed below:

Retrieve a catalog upon request. The catalog will include all content for a shopping experience. For products, the information will include the product description, price and options.

Retrieve a list of products matching a query. This will initially support simple keyword searching, but may be expanded to more sophisticated searching techniques.

3. Credit Processor—Conducts card validation and fraud screening.

The credit processor takes a candidate order and performs card authorization and fraud screening. The card processor cooperates with the order tracker to keep the status of the order updated.

Perform Credit Card Authorization. Contact the card processing vendor and authorize the card. Retrieve the Address Verification System (AVS) code for use in fraud screening.

Perform Fraud Screening. The system performs a fraud screening analysis based on the following factors: dollar amount of the order, AVS code, whether the billing and shipping address match, and whether the email address given is a free e-mail account.

4. Notifier—Sends messages.

The Notifier keeps track of who wants to be notified of what and how they should be notified. The notifier receives notification of various system events and takes the appropriate course of action. The appropriate course of action will depend upon the event and the party to be notified. For example, a merchant that does a high volume of sales and is already integrated with the system may not wish to receive email notification of every order.

5. Ledger—Records and reports on all financial events.

The Ledger is a record of all financial events. The ledger contains interfaces for posting events and interfaces querying and inspecting the ledger. Responsibilities include:

Post an Order Event. The order event happens when the shopper confirms an order.

Post a Sale Event. The sale event occurs when a merchant marks the last item in an order shipped.

Post an Return Merchandise Authorization (RMA) Open Event/Post an RMA Completed Event/Post an RMA Canceled Event Post a Journal Entry. This interface will be used to record non-standard events. The posted ledger entries must collectively have an equal number of debits and credits.

6. Order Tracker—Records and reports on order status.

This is the repository of order information. The order tracker includes a cashier's interface for creating a new order, a Merchant's interface for keeping the order status updated, and a Customer Service interface for checking on the status of the order and making relevant annotations.

Query Order Status. This method is used by purchaser to check on the status of a pending order.

Ship Order. This method is used by a merchant to document the parceling of an order into shipments.

7. Shopping Cart—Holds products that have been selected for purchase.

The shopping cart is simply a collection of Inventory Reservation documents that represent the items that have been selected by the shopper. The shopping cart includes methods for adding and removing Inventory Reservations and for inspecting the contents of the cart.

8. Warehouse—Inventory availability information. Product configuration interfaces.

The Warehouse represents a collection of physical items that are in stock. Responsibilities of the Warehouse are listed below:

Provide Information on Stock Levels of a Particular Item/Order Items Having Low Inventory Levels. This is an advanced capability by which inventory may be dynamically reserved from a merchant, based on the current inventory levels.

Provide Information on Product Configuration Options. The warehouse will provide a blank Inventory Reservation document that will specify all of the product's configuration options.

Issue Reservations Against Inventory. A shopper will fill out an Inventory Reservation (which includes all configuration options) and submit it to the warehouse. If the item, as configured, is available, the reservation will be issued. This will serve to reserve the inventory for a fixed period of time.

Database Server Tier

Finally, the Database server tier is composed of a single software layer. This layer is responsible for low level manipulation of the data in the one or more databases. This tier may consist of multiple database servers. Using multiple servers is a major advantage for obvious reasons. The system's database chores can be distributed to many different servers. In a preferred embodiment, the database server is Object Design's Objectstore server. Objectstore supports a "warm failover" mode which allows a backup server to take over automatically if the primary should fail. An Microsoft SQL server is also used in the preferred embodiment to maintain financial records although properly configured another DBMS such as Objectstore or a commercially available accounting package could provide capability suitable for financial record keeping.

The foregoing discussion describes the primary actors interacting with a system according to the present invention. After identifying these actors, typical transaction flows through the system are presented.

There are three main parties in the outsourced e-commerce relationship, excluding the end consumer. These parties include Merchants, Hosts, and the e-commerce outsource provider. This folds into two parties where one party plays the dual role of Host and Merchant.

Merchants

Merchants are the producers, distributors, or resellers of the goods to be sold through the outsource provider. The primary responsibilities of a Merchant are to:

- Maintain an up-to-date catalog within the system including all products that are available for sale in storefronts served by the outsource provider
- Create approval standards for passively recruited Host applicants based upon website profiles and target audience characteristics
- Fulfill all orders received from the e-commerce outsource provider
- Provide assistance to outsource provider regarding promotional strategies. This can be accomplished by supplying marketing literature and materials, as well as any sales incentives. The Merchant owns the marketing literature and materials, and may access and modify these items as necessary.
- Provide service and support to customers generated via the outsource e-commerce provider
- Maintain internal records of orders filled through the outsource provider and process payments from the outsource provider for these orders
- Inform the e-commerce outsource provider of any backlogs, fulfillment delays, product changes, or other significant situations

Hosts

A Host is the operator of a website that engages in Internet commerce by incorporating one or more link to the e-commerce outsource provider into its web content. The responsibilities of a Host are to:

- Use the outsource provider Host Manager service bureau to select the Merchants and products that will be offered from the Host's website
- Promote transactions through the e-commerce outsource provider hosted by the website
- Regularly review the Merchant offerings for which they have been approved in order to take advantage of new products and to review sales and promotional strategies made available to them by the Merchant

E-Commerce Outsource Provider

The role of outsource provider is to:
- Develop and maintain the outsource provider service bureau—the systems and software which provide the platform for e-commerce support services
- Identify and recruit target Host websites and monitor/manage these relationships
- Create customer-transparent Host processing "pages" on a secure server to receive order and payment information
- Create, maintain, and update the "look & feel capture" process through which consumers are able to shop in a Merchant-controlled storefront within the design and navigational context of the Host website, preserving the ownership of the visit experience by the Host
- Authorize credit card transactions (in most cases)
- Process credit card payments for orders received (in most cases)
- Pay periodic commissions to Hosts for orders shipped during a prior period
- Transmit orders to Merchants
- Pay Merchants for orders filled
- Manage the commission structure for Merchant-Host relationships to maximize sales and revenues
- Screen and approve Host applications
- Support and monitor the merchandise return/refund process and other customer service functions This following describes the order entry and settlement process from the initial promotion on a Host website all the way through to fulfillment, payment processing, commission payment, and Merchant payment.

Order Placement, Fulfillment, and Settlement Overview

The overall transaction process is very straightforward. The following is a list of the steps involved in receiving and processing an order request.

a) A customer visits a Host website and, through contextually relevant content, becomes interested in a product offered.

b) The customer selects the item(s) that she wishes to purchase by clicking a product image, banner-style link, or text link, or other offer format taking her to a dynamically generated web pages which retain the look and feel of the referring Host and are served by the e-commerce outsource provider.

c) The customer browses through the products offered, indicating which items are to be purchased and in what quantities via forms on-screen. Selected items appear within the shopping cart at the top of the shopping interface. The user remains on the product screen without ever being involuntarily removed to a detailed shopping cart-only screen, representing a significant enhancement over most shopping cart technology in place today. When all desired products are selected, the customer initiates the checkout procedure, never leaving the Host website.

d) The secure checkout interface appears, still consistent in look and feel with the Host's referring website. The customer completes the order form, provides all billing and shipping information required, confirms the items selected for purchase, and remits credit card information for payment processing.

e) Assuming the payment method is authorized, the customer is returned to another section of the Host's website, possibly just returning to the page in which the offer was placed, as determined by the Host.

f) The e-commerce outsource provider passes the order to the Merchant in real time. The credit card may be charged at this point or upon confirmation of shipment.

g) The Merchant receives and logs the order.

h) The Merchant then assembles and ships the order to the customer, keeping the outsource provider apprised of the order status.

i) Periodically, the outsource provider will remit payment to the Merchant for that period's filled orders.

j) Periodically, the outsource provider will remit payment to Hosts for all commissions earned in the prior period.

Host Process Flow

The process flow for a prospect to become a Host and be fully able to endorse/promote/offer Merchant products is as follows:

a) Hosts are recruited from three sources: direct recruiting, in which the Host prospect is identified by and approached by an e-commerce outsource provider representative; passive recruiting, in which the Host has been referred to the outsource provider by other Hosts, relevant meta-sites (sites that contain lists of and links to other sites/services), or other sources; and Host Agent recruits, in which a specialized third party Agent identifies and approaches Host prospects. In many cases, the use of online signup forms and brochures may be a factor in recruitment.

b) Prospect completes the Host application form (except where preapproved), providing information about the type of website(s) operated by the Host, some traffic statistics about these websites and general visitor demographics, and complete contact information. The prospect also selects an outsource provider system user ID and password which will later be used to access the system, retrieve important Hosting information and programming, and modify the custom materials in the outsource provider transaction processing engine.

c) The application is received and the information therein is reviewed, and the application is either approved or rejected (unless this is a preapproved Host). If approved, the Host's ID and password are activated, and an automated message is sent to the new Host informing them of their approval. This message will also contain instructions for accessing the e-commerce outsource provider system, setting up their links to the outsource provider, and inserting outsource provider data into their website(s). Preapproved Hosts will be immediately able to access this system upon submission of their application.

d) Host accesses e-commerce outsource provider system to begin the step-by-step setup process. The Host first identifies a page from their own website which will provide the look and feel to be replicated. Following this, the Host configures product selections for each of its approved Merchants and downloads product images, text, and CGI/HTML code for their own website. Host then completes changes to website and activates new content. Hosts are free to promote their use of the outsource provider as they feel is suitable to the product at any time and with any frequency, subject to reasonable limitations.

e) Hosts will be able to access real-time reports about transaction volume including number of users, average purchase amount per user, number of purchases on specified days or within specified date ranges. Hosts can create customized reports to determine conversion rates, top selling products, commissions earned, paid, and due, and other pertinent information. This information can be leveraged by the e-commerce outsource provider and the Host to improve the efficacy of targeted marketing efforts on the Host's website.

Internal System Transaction Flow

The e-commerce outsource provider system acts as a clearinghouse for all orders. The system maintains a real-time interface with a credit card authorization and processing service and a robust database engine which is able to process transactions, record all transaction activities, generate reports used for commission payments and auditing of Merchant invoices, and track order status. The transaction flow for the outsource provider service bureau is directly related to the structure of the underlying database.

This flow can be described as follows:

a) Customer, visiting Host, activates link to commerce object within context of Host's website. This activation is typically accomplished by clicking on a hyperlink of some kind within a webpage of the Host's website.

b) The e-commerce outsource provider launches new storefront featuring specific products or product category for Merchant, as determined by Host, with the look and feel of the Host's site. The user is not made aware of the fact that this shopping experience is taking place on an outsourced server.

c) As customer browses through featured items in the Merchant's catalog, the outsource provider serves additional pages while maintaining the look and feel of the Host. The system maintains a dynamic record of customers activities including products reviewed, items selected for purchase (placed into shopping cart), and time spent shopping. The e-commerce outsource provider uses a highly reliable and accurate tracking technology throughout the shopping experience.

d) Upon checkout, the system processes customer billing, shipping, and order information via secure (encrypted) data transmission (unless the consumer opts for non-encrypted transmission). This process includes an order confirmation process and a process by which a non-approved credit card transaction may be corrected and resubmitted.

e) Upon approval, the outsource provider performs several simultaneous functions:

Thank you screen is displayed to customer

Customer is prompted to "continue" browsing Host's website.

E-mail confirmation is sent to customer detailing order information, fulfillment process, customer service terms and procedures, and other relevant information.

Order is transmitted to the Merchant electronically, via e-mail or direct link to order entry system.

Order is logged into transaction database and logged by system in conjunction with Host referral information.

Host is notified that a sale has been made and commission dollars have been earned.

The second part of the e-commerce outsource provider service bureau transaction process pertains to reconciliation and settlement with the Merchants.

a) Orders are transmitted to each Merchant as received and are logged into the system for future reference and reporting.

b) Periodically, the outsource provider will pay each Merchant for orders processed during the prior period. Payment will be driven by shipped orders as recorded within the system. Merchants can view their accumulated sales within the system at any time during the period, and historical information will be available as well.

The final part of the e-commerce outsource provider Service Bureau transaction process pertains to the payment of commissions to Hosts.

c) Periodically, the e-commerce outsource provider will calculate the accumulated commissions due to each Host from the prior period's results. Hosts will be able to review their earnings on a real-time basis at any point during a period.

d) The outsource provider will then pay each Host the appropriate commission amount via electronic payment or check along with a copy of the transactions and total report for the period being settled.

Merchant Transaction Flow

Each Merchant will be required to fulfill every order received through the e-commerce outsource provider within a designated time frame. Merchants must also be able to track certain information regularly and accurately. Merchants will be monitored to ensure timely fulfillment in order to provide the best quality customer service.

The steps of the Merchants transaction flow after they have been established within the system are as follows:

a) The designated recipient of orders within the Merchant organization will check for new orders at least on a daily basis, if not more frequently. Orders are received by the Merchant via e-mail or other electronic notification, including automated direct input to legacy order management systems owned or operated by the Merchant. These orders include all pertinent customer data required for fulfillment of each order. Merchants may also view all orders online, sorted by date, status (new/viewed), or other criteria, and download orders in bulk form directly from the outsource provider.

b) After receiving the order, the Merchant will ship the order to the Customer within a reasonable time period for the type of merchandise ordered. Merchant will have the ability to modify the shipping status of the orders within the system. Merchants are obligated to provide timely shipping of their products. If any item ordered is out of stock or discontinued, the Merchant must update their catalog on the e-commerce outsource provider immediately and notify any affected customers immediately via e-mail or regular mail. Orders should be processed according to whatever internal process flow has been established by the Merchant.

c) Upon receipt of payment for the prior month's orders, the Merchant is responsible for reconciling the amount remitted with their own fulfillment records. Any disputes should be addressed by accessing the Merchant interface and querying/updating records.

The embodiments described above are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An e-commerce outsourcing process comprising:
   a) capturing a look and feel description associated with a host website and storing HTML code corresponding to the look and feel description at a second website;
   b) providing the host website with a link for inclusion within a page on the host website for serving to a visitor computer, wherein the provided link correlates the host website with a selected commerce object; and
   c) upon receiving an activation of the provided link from the visitor computer, serving to the visitor computer from the second website page with a look and feel corresponding to the captured look and feel description of the host website associated with the provided link and with content based on the commerce object associated with the provided link;
whereby the visitor receiving the served page at the visitor computer perceives the page as associated with the host website even though it is served from the second website.

2. The process of claim 1, wherein the selected commerce object is an indicator for dynamic content selection.

3. The process of claim 2, wherein the content within the served page is dynamically selected according to contextual information derived from the page on the host website including the provided link.

4. The process of claim 1, wherein the selected commerce object is a selected product.

5. The process of claim 1, wherein the selected commerce object is a selected product category.

6. The process of claim 1 wherein capturing a look and feel description associated with a host website comprises:
   a) receiving an identification for an example page from a target website;
   b) retrieving the example page via a communication link to the target website;
   c) identifying look and feel elements within the retrieved example page; and
   d) storing the identified look arid feel elements as a look and feel description associated with the target website in a data store.

7. The process of claim 1 wherein capturing a look and feel description associated with a host website comprises:
   a) receiving a URL reference to an example page of a target website in an input field of a computer program; and
   b) receiving with the computer program selections of HTML code encoding the identified look and feel elements.

8. An e-commerce outsourcing system comprising:
   a) a data store including a look and feel description associated with a host website;
   b) a communication link to a visitor computer; and
   c) a processor for executing instructions that perform the steps of:
      i) capturing a look and feel description associated with a host website;
      ii) storing the captured look and feel description in the data store;
      iii) providing the host website with a link for inclusion within a page on the host website correlating the host website with a selected commerce object; and
      iv) upon receiving an activation of the provided link via the communication link, serving an e-commerce supported page via the communication link with a look and feel based on the look and feel description in the data store and with content based on the commerce object associated with the provided link; whereby a visitor receiving the served page at the visitor computer perceives the page as associated with the host website even though it is served from the data store.

9. The process of claim 8, wherein the selected commerce object is an indicator for dynamic content selection.

10. The process of claim 9, wherein the content within the sewed page is dynamically selected according to contextual information derived from the page on the host website including the provided link.

11. The system of claim 8, wherein the data store further includes a product record and wherein the selected commerce object is a selected product record.

12. The process of claim 8, wherein the data store further includes a product category record and wherein the selected commerce object is a selected product category record.

13. An e-commerce outsourcing system comprising:
a) a data store including a look and feel description associated with a host web page having a link correlated with a commerce object; and
b) a computer processor coupled to the data store and in communication through the Internet with the host web page and programmed, upon receiving an indication that the link has been activated by a visitor computer in Internet communication with the host web page, to serve a composite web page to the visitor computer wit a look and feel based on the look and feel description in the data store and with content based on the commerce object associated wit the link.

14. A method for serving pages containing dynamically selected content, comprising:
a) receiving the activation of a link on a web page designated for dynamic content selection via a communication link from a visitor computer;
b) retrieving the web page containing the activated link;
c) automatically selecting content from a content data store based upon analysis of the content of the retrieved web page;
d) automatically constructing a web page containing a combination of the selected content and a look and feel corresponding to the retrieved web page; and
e) serving the constructed page to the visitor computer via the communication link.

15. The method of claim 14 wherein analysis of the content of the retrieved web page comprises identification of keywords marked in the retrieved web page.

16. The method of claim 14 wherein analysis of the content of the retrieved web page comprises counting the frequency of keywords on the retrieved web page.

17. An e-commerce outsourcing process comprising the steps of:
a) storing a look and feel description associated with a first website in a data store associated with a second website;
b) including within a web page of the first website, which web page has a look and feel substantially corresponding to the stored look and feel description, a link correlating the web page with a commerce object; and
c) upon receiving an activation of the link from a visitor computer to which the web page has been served, sewing to the visitor computer from the second website a composite web page having a look and feel corresponding to the stored look and feel description of the first website and having content based on the commerce object associated with the link.

18. The process of claim 17 wherein the look and feel description comprises data defining the appearance of the top and left side of at least some of the web pages of the first website.

19. The process of claim 17 wherein the look and feel description comprises data defining the appearance of the header and footer of at least some of the web pages of the first website.

20. The process of claim 17 wherein the look and feel description comprises data defining a set of navigational links, used on at least some of the web pages of the first website, each of which links link to specific web pages of the first website.

21. The process of claim 17 wherein the look and feel description comprises data defining:
a) a logo associated with and displayed on at least some of the web pages of the first website;
b) a color scheme used on at least some of the web pages of the first website;
c) a page layout used on at least some of the web pages of the first website; and
d) navigational links, used on at least some of the web pages of the first website, each of which links link to specific web pages of the first website.

22. The process of claim 17 wherein storing a look and feel description associated with a first website in a data store associated with a second website comprises designing a first website, identifying look and feel descriptions associated therewith, and storing the identified look and feel descriptions in the data store associated with the second website.

23. The process of claim 17 wherein the commerce object is a set of product categories and further comprising accepting search parameters through the composite web page and using said parameters to search for specific products within the product categories.

24. The process of claim 17 further comprising storing at the second website data concerning a plurality of commerce objects.

25. The process of claim 24 further comprising contracting with merchants offering products or services for sale to include data concerning the commerce objects of said merchants at the second website.

26. The process of claim 17 further comprising, after part (c), responsive to an indication received from the visitor computer of a desire to purchase a product or service identified in the content based on the commerce object and served in the composite web page, capturing billing information from the visitor computer and passing captured billing information to a merchant offering the indicated product or service.

27. The process of claim 17 wherein the commerce object is a set of product categories, each comprising a plurality of products or services, and further comprising:
a) before serving the composite web page to the visitor computer:
  i) contracting with merchants offering the products or services for sale to include data concerning the commerce objects of said merchants at the second website, and
  ii) storing at the second website data concerning the plurality of products or services; and
b) after serving the composite web page to the visitor computer:
  i) accepting search parameters through the composite web page and using said parameters to search for specific ones of the plurality of products or services within the product categories, and
  ii) responsive to an indication received from the visitor computer of a desire to purchase one of the plurality of products or services identified through the search, capturing billing information from the visitor computer and passing captured billing information to the merchant offering the indicated product or service.

* * * * *

UNITED STATES PATENT AND TRADEMARK OFFICE
CERTIFICATE OF CORRECTION

PATENT NO. : 6,993,572 B2  Page 1 of 1
APPLICATION NO. : 10/461997
DATED : January 31, 2006
INVENTOR(S) : D. Delano Ross, Jr. et al.

It is certified that error appears in the above-identified patent and that said Letters Patent is hereby corrected as shown below:

Column 12 line 49 to Column 13 line 22 is identical to Column 13 line 23 to Column 13 line 63. This text in this section should appear only once.

Column 21 line 5, "In a preferred embodiment," should start a new paragraph.

In the claims:

Column 27 line 60 (Claim 1), after "website" insert --a--

Column 28 line 19 (Claim 6), change "arid" to --and--

Column 28 line 59 (Claim 10), change "sewed" to --served--

Column 29 line 10 (Claim 13), change "wit" to --with--

Column 29 line 13 (Claim 13), change "wit" to --with--

Column 29 line 45 (Claim 17), change "sewing" to --serving--

Signed and Sealed this

Twenty-fourth Day of February, 2009

JOHN DOLL
*Acting Director of the United States Patent and Trademark Office*

US006993572C1

(12) EX PARTE REEXAMINATION CERTIFICATE (7626th)
United States Patent
Ross, Jr. et al.

(10) Number: US 6,993,572 C1
(45) Certificate Issued: Jul. 20, 2010

(54) SYSTEM AND METHOD FOR FACILITATING INTERNET COMMERCE WITH OUTSOURCED WEBSITES

(75) Inventors: D. Delano Ross, Jr., Alpharetta, GA (US); Daniel D. Ross, Dunwoody, GA (US); Joseph R. Michaels, Marietta, GA (US); William R. May, Atlanta, GA (US); Richard A. Anderson, Powder Springs, GA (US)

(73) Assignee: DDR Holdings, LLC, Dunwoody, GA (US)

Reexamination Request:
No. 90/008,374, Dec. 13, 2006

Reexamination Certificate for:
Patent No.: 6,993,572
Issued: Jan. 31, 2006
Appl. No.: 10/461,997
Filed: Jun. 11, 2003

Certificate of Correction issued Feb. 24, 2009.

Related U.S. Application Data

(63) Continuation of application No. 09/398,268, filed on Sep. 17, 1999, now Pat. No. 6,629,135.
(60) Provisional application No. 60/100,697, filed on Sep. 17, 1998.

(51) Int. Cl.
*G06F 15/16* (2006.01)
*G06F 17/21* (2006.01)

(52) U.S. Cl. .................. 709/218; 715/205; 715/234; 715/248; 715/249; 715/255
(58) Field of Classification Search .................. None
See application file for complete search history.

(56) References Cited

U.S. PATENT DOCUMENTS 5,970,472 A 10/1999 Allsop et al.
6,016,504 A 1/2000 Arnold et al. ............... 709/200
6,141,006 A 10/2000 Knowlton et al.

FOREIGN PATENT DOCUMENTS

WO    WO 98/20434 A2    5/1998

OTHER PUBLICATIONS

Archive web page at www.Statenisland.com; Apr. 18, 1997.
Archived web page at www2.travelnow.com; Sep. 21, 1999.
Archived web pages at www.sextoy.com; May 17, 1998.
Andrews; "Partners in Affiliate Marketing Struggle with Branding Issues"; *Internet World*; Apr. 13, 1998.
Marciano; "Are Affiliate Programs for You?"; *Web Marketing Today*; Apr. 1, 1998.
Archived web pages at www.one–and–only.com; Apr. 1999.
Archived web page at www.financing.hosting.ibmm.com; Dec. 27, 1996.
Archived web page at www.ibm.com; Dec. 20, 1996.
Archived web page at www.dbx.com; (NYSE); 1996.
"Data Broadcasting to Offer Real–time Internet Quote Service for $29.95 a Month"; *M2 Presswire*; Jan. 3, 1996.
"Data Broadcasting Real–time Stock Market Quote Service Begins; $29.95 Monthly Fee Includes Mandatory Exchange Fees"; *Business Wire*; Apr. 26, 1996.
Archived web page at www.dbc.com; Nov. 15, 1996.
Quote.com Provides Seven High–Profile Web Sites with Financial News and Informartion; *PR Newswire*; Jun. 10, 1996.

*Primary Examiner*—Alexander J Kosowski

(57) ABSTRACT

An e-commerce outsourcing system and method provides hosts with transparent, context-sensitive e-commerce supported pages. The look and feel of a target host is captured for future use. The host is provided with one or more links for inclusion within a page on the host website that correlates with a selected commerce object, which may be contextually related to material in the page. The commerce object can be a product, a product category, or a dynamic selection indicator. Upon activation of the provided link, a visitor computer is served with a page with the look and feel of the host website and with content based upon the associated commerce object. Where the commerce object is a dynamic selection indicator, the content is selected at the time of activation based upon an analysis of the page containing the activated link.

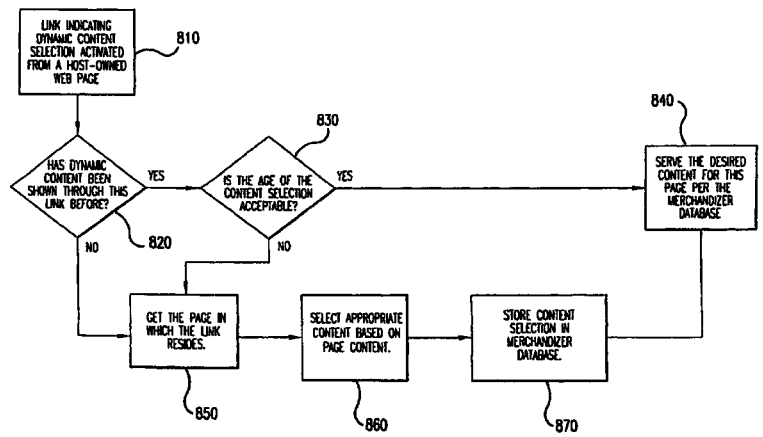

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 4, 5, 13 and 17-27 is confirmed.

Claims 2-3, 6-12 and 14-16 were not reexamined.

* * * * *